(12) United States Patent
Hansen et al.

(10) Patent No.: US 9,696,164 B2
(45) Date of Patent: *Jul. 4, 2017

(54) SYSTEMS, METHODS, AND APPARATUS TO DETERMINE PHYSICAL LOCATION AND ROUTING WITHIN A FIELD OF LOW POWER BEACONS

(71) Applicant: INTERMEC IP CORP., Everett, WA (US)

(72) Inventors: Michael Hansen, Everett, WA (US); Allen White, Snohomish, WA (US); Ronald Van Der Putten, Everett, WA (US)

(73) Assignee: INTERMEC IP CORP, Lynnwood, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/792,974

(22) Filed: Jul. 7, 2015

(65) Prior Publication Data

US 2015/0308835 A1 Oct. 29, 2015

Related U.S. Application Data

(63) Continuation of application No. 14/263,644, filed on Apr. 28, 2014, now Pat. No. 9,127,949, which is a
(Continued)

(51) Int. Cl.
*G01C 21/00* (2006.01)
*G01S 5/02* (2010.01)
*G01C 21/20* (2006.01)

(52) U.S. Cl.
CPC .......... *G01C 21/206* (2013.01); *G01S 5/0252* (2013.01)

(58) Field of Classification Search
CPC . G01S 1/08; G01S 5/02; G01S 5/0252; G01C 21/20; G01C 21/206
(Continued)

(56) References Cited

U.S. PATENT DOCUMENTS 5,977,913 A   11/1999 Christ
6,925,378 B2 *  8/2005 Tzamaloukas ..... G01C 21/3492
                                                   455/456.1
(Continued)

OTHER PUBLICATIONS

Helén et al; "Using Calibration in RSSI-based Location Tracking System;" Proc. of the 5th World Multiconference on Circuits, Systems, Communications & Computers (CSCC20001); 2001; 5 pp.
(Continued)

*Primary Examiner* — Tan Q Nguyen
(74) *Attorney, Agent, or Firm* — Oliff PLC; R. Brian Drozd

(57) ABSTRACT

A non-time of flight or time of arrival position location system for accurate determination of a user's location in an enclosed, indoor, or covered environment can include a number of beacons mounted in an arrangement within the environment. Each of the beacons is mounted in a known location and transmits a broadcast signal containing a unique identifier that identifies the originating beacon. A handheld electronic device including a receiver and a communicably coupled processor can receive broadcast signals from at least some of the number of beacons, iteratively determine a vector quantity corresponding to each of the received signals, and sum the resultant vector quantities to determine an updated position. The iterative process can be repeated until consecutive iterations yield an updated position that falls within a defined threshold.

20 Claims, 10 Drawing Sheets

Related U.S. Application Data continuation of application No. 13/739,947, filed on Jan. 11, 2013, now Pat. No. 8,712,690.

(58) Field of Classification Search
USPC .......... 701/526, 527; 340/357.031, 357.021
See application file for complete search history.

(56) References Cited

U.S. PATENT DOCUMENTS

| | | | |
|---|---|---|---|
| 7,038,584 B2 | 5/2006 | Carter | |
| 7,269,427 B2 | 9/2007 | Hoctor et al. | |
| 7,528,723 B2 | 5/2009 | Fast et al. | |
| 7,739,034 B2 | 6/2010 | Farwell | |
| 8,085,190 B2 | 12/2011 | Sengupta et al. | |
| 2007/0291682 A1* | 12/2007 | Anjum | H04L 63/06 370/328 |
| 2012/0194382 A1 | 8/2012 | Anderson et al. | |
| 2013/0317778 A1* | 11/2013 | Gupta | G01S 5/0036 702/150 |

OTHER PUBLICATIONS

Lau et al; "Enhanced RSSI-based High Accuracy Real-Time User Location Tracking System for Indoor and Outdoor Environments;" International Journal on Smart Sensing and Intelligent Systems I(2): pp. 534-548; Jun. 2008.

Liu et al; "Survey of Wireless Indoor Positioning Techniques and Systems," IEEE Transactions on Systems, Man, and Cybernetics—Part C: Applications and Reviews 37(6); pp. 1067-1080; Nov. 2007.

\* cited by examiner

SYSTEMS, METHODS, AND APPARATUS TO DETERMINE PHYSICAL LOCATION AND ROUTING WITHIN A FIELD OF LOW POWER BEACONS

CROSS-REFERENCE TO RELATED APPLICATIONS

This is a Continuation of application Ser. No. 14/263,644 filed Apr. 28, 2014, which in turn is a Continuation of application Ser. No. 13/739,947 filed Jan. 11, 2013. The disclosure of the prior applications is hereby incorporated by reference herein in its entirety.

FIELD

The present disclosure generally relates to the field of positioning systems, more specifically to positioning systems that do not employ time of flight in determining position.

BACKGROUND

Outdoor radio frequency position location systems have grown from specialized time-of-flight ("TOF") or return time-of-flight systems ("RTOF") such as long range aid to navigation ("LORAN") transmitters used by mariners and pilots to the present-day global positioning system ("GPS") receivers found in many vehicles, smartphones, and similar handheld electronic devices. While such outdoor-use positioning systems have revolutionized the way in which people navigate and find their location on the surface of the Earth, an inherent weakness in such systems is their inability to accurately determine a user's location when in an enclosure or in an indoor or covered location. In particular, such conditions include instances where a direct line of sight to one or more position location transmitters such as a cellular or radio tower or satellite, is obstructed or unavailable. In such situations, position location information either is not reported or is reported with a significant degree of positional uncertainty.

Indoor position location is valuable in many applications that include, but are not limited to: manufacturing (e.g., tracking an article or a collection of articles through a manufacturing process), warehousing (e.g., determining the location of one or more items), merchandising (e.g., finding consumer items in a retail environment or shopping mall) and security (e.g., finding an escape route from a building). Indoor position location technologies include systems that are able to provide absolute location data (e.g., position location data relative to an absolute scale such as latitude and longitude) or relative location data (e.g., position location data relative to a non-absolute scale such as location within a building or location relative to one or more transmitters. In many instances, such indoor position location systems make use of trilateration or multilateration techniques including time-of-arrival ("TOA"), TOF, or RTOF in which the location of a mobile receiver is determined based on the time required for a signal to propagate between one or more fixed transmitters and the mobile receiver. Such systems rely upon the presence of a highly accurate timekeeper in at least one of either the fixed transmitter or mobile receiver and/or the transmission of time stamp generated by a highly accurate timekeeper between the transmitter and the receiver to accurately determine the time shift of the signal and hence the distance between the fixed transmitter and the mobile receiver. Such time-of-flight systems require a significant investment in fixed transmitter infrastructure and/or mobile receivers having highly accurate timing or clocking systems to provide the necessary resolution enabling an accurate positional fix. Additionally, signal reflections and shadow areas within the environment may adversely impact the accuracy of time-of-flight systems.

Other methods for determining an indoor location exist. One such method includes angulation where the angles of arrival of a number of signals generated by a respective number of fixed transmitters in known locations are detected using a mobile device. By combining angle of arrival data acquired from at least two of the fixed transmitters, a two (or three) dimensional position corresponding to the location of the mobile device may be determined. Such systems however rely upon the use of costly directional antennas or antenna arrays coupled to the mobile device to accurately determine the angle of arrival of the incoming signals. Additionally, the performance and accuracy of such angle of arrival systems is compromised in environments where signal reflections and shadows exist.

Given the various compromises, costs, and accuracy issues surrounding available indoor position location systems, what is needed is an accurate yet flexible low cost indoor positioning system.

SUMMARY

An indoor position location system can include a number of beacons each positioned in known, fixed, location within an enclosed, indoor, or covered environment. Each of the number of beacons can generate a broadcast signal that includes data that uniquely identifies the originating beacon. In at least some instances, each beacon can generate a broadcast signal containing only data that uniquely identifies the originating beacon. Beginning at a known selected arbitrary or defined initial location, a receiver receives broadcast signals from at least some of the number of beacons. Using the initial location of the receiver and the known locations of the beacons, a processor determines vector quantities characterizing each of the respective received broadcast signals. The vector quantity can be at least partially characterized by a direction coincident with a straight line connecting the known initial location of the receiver with the known location of the respective beacon. The vector quantity may be further characterized by a magnitude that is determined using a received signal strength ("RSSI") value associated with the broadcast signal generated by the respective originating beacon. The vector quantities corresponding to all or a portion of the received broadcast signals can be summed (e.g., using vector addition) to determine an updated receiver position with respect to the beacons. Where the known locations of the beacons are provided in an absolute coordinate system (e.g., as a latitude and longitude) the position of the receiver may be further related to the same absolute coordinate system. When the updated receiver location provided by a number of consecutive iterations falls within a defined range or threshold the location of the receiver is reported to a user via one or more output devices such as a speaker or display.

Advantageously, the beacons used in the indoor position location system need not be networked, communicably linked, or temporally synchronized. In fact, in at least some instances the beacons may be operated asynchronously. By eliminating the need to temporally synchronize the beacons, no network infrastructure is needed to support beacon and lower cost, asynchronous beacons may be used to provide all or a portion of the system. Additionally, the flow of broadcast signals from the beacons permits an ongoing updating of the vector quantities, further enhancing the overall accuracy of the position location system. The relatively low overhead requirements used in the instant, non-time of flight dependent, vector based, position location method are suitable for implementation on portable receivers or handheld electronic devices having limited local processing resources. Additionally, the ability to offload at least a portion of the computations to one or more processors external to the portable receiver or device (e.g., by transmitting data indicative of RSSI value and the unique identifier associated with each of the received broadcast signals) permits the use of handheld electronic devices having very limited onboard resources.

In at least some instances, sufficient positional accuracy is possible using the non-time of flight, vector based, indoor position location methods described herein to permit the use of one or more route determination methods or optimal route determination methods based upon the provision by a user of a number of defined waypoints to the position location system. Advantageously, the user may provide at least a portion of the defined waypoints to the position location system in the form of non-location based waypoints. A processor within the position location system may autonomously determine a physical location corresponding to the non-location based waypoint using a data table or similar data store that is retained in a processor readable nontransitory medium. For example, a user may enter "CORN FLAKES" into the position location system, and the processor may perform a lookup or similar retrieval function from a data store containing data indicative of which beacon 102 is physically closest to the corn flakes. Based on the user's current location as determined by the position location system 100, a preferred routing may then be provided to the user that minimizes the time or distance to travel from the user's initial location to the determined location of the corn flakes. Such route determination methods, and in particular the ability to use colloquial or such non-location based terms to define waypoints may also be advantageously employed in warehouse settings to improve the speed and efficiency of picking and cargo transfer operations.

A non-time of flight or time of arrival position location system may be summarized as including a receiver to receive a plurality of broadcast signals, each of the plurality of received signals characterized by a respective signal strength and by data that uniquely identifies an originating one of a plurality of terrestrial radio frequency beacons positioned in a respective known location within an indoor environment; at least one input/output device; a processor communicably coupled to the receiver and the at least one input/output device; and processor-executable instructions that cause the processor to: determine an initial receiver location relative to the known locations of at least some of the plurality of beacons; for each of the received broadcast signals, iteratively determine an updated receiver location relative to the known locations of the at least some of the plurality of beacons by causing the processor to: determine a vector quantity including a magnitude and a direction associated with each of the plurality of received broadcast signals to provide a respective plurality of vector quantities; and sum the resultant plurality of vector quantities to determine the updated receiver location until a number of consecutive iterations provide updated receiver locations falling within a defined limit; and generate at least one human perceptible output indicative of the updated receiver location via the at least one output device.

The non-time of flight or time of arrival position location system may further include a nontransitory storage media communicably coupled to the processor, the nontransitory storage media to store a number of defined locations indexed by one or more non-location based identifiers; wherein the executable instructions may further cause the processor to: receive data representative a number of non-location based identifiers; determine a number of defined locations, each of the number of defined locations associated with a respective one of the number of received non-location based identifiers; determine a preferred routing to each of the number of defined locations within the environment; and generate at least one human-perceptible output indicative of progressive directional information along the preferred routing.

The receiver and the at least one output device may be at least partially disposed in a portable housing, the processor may be disposed remote from the portable housing and the communicable coupling between the receiver, the at least one output device and the processor may include a wireless communicable coupling. The receiver and the at least one output device and the processor may be collocated and at least partially disposed in a portable housing. The at least one output device may include at least one of: an audio speaker, an audio output interface, a display device, a display output interface, or a touchscreen. To determine an initial receiver location, the processor-executable instructions may cause the processor to: generate and store data representative of an initial beacon list in a nontransitory storage medium communicably coupled to the processor, the initial beacon list including for each of the plurality of received signals: data indicative of the signal strength of the received signal and data indicative of the unique identifier associated with the respective originating beacon; and set the initial receiver location equal to the location of the beacon providing the greatest signal strength at the receiver. To determine the vector quantity including a magnitude and direction associated with each of the plurality of received signals, the processor-executable instructions may cause the processor to: replace all or a portion of the data representative of the initial beacon list with data representative of an updated beacon list, the data representative of the updated beacon list including for each of the plurality of received signals: data indicative of the signal strength of the respective signal and the data indicative of the unique identifier associated with the respective originating beacon. The processor-executable instructions may further cause the processor to: remove the signal strength and unique identification data representative of a beacon from the updated beacon list to purge stale data when the signal strength of the signal provided by the respective beacon fulfills at least one defined removal criterion. Each of the plurality of broadcast signals may consist of data that uniquely identifies one of the plurality of terrestrial radio frequency beacons originating the respective signal.

A non-time of flight or time of arrival position location method may be summarized as including receiving by a receiver communicably coupled to a processor a plurality of broadcast signals, each of the plurality of received signals characterized by a respective signal strength and by data that uniquely identifies an originating one of a plurality of terrestrial radio frequency beacons positioned in respective known locations in an indoor environment; determining by the processor an initial receiver location relative to the known locations of at least some of the plurality of beacons; iteratively determining an updated receiver location relative to the known locations of at least some of the plurality of beacons by: determining a plurality of vector quantities by the processor, each vector quantity in the plurality of vector quantities including a magnitude and a direction associated with the signal received from each of a plurality of originating beacons; and summing the plurality of vector quantities by the processor to determine the updated receiver location until a number of consecutive iterations provide updated receiver locations falling within a defined limit; and generating at least one human-perceptible output indicative of the updated receiver location via at least one output device communicably coupled to the processor.

The non-time of flight or time of arrival position location method may further include determining a preferred routing to each of a number of defined locations in the indoor environment; and generating at least one human perceptible output indicative of progressive directional information along the preferred routing.

Determining a preferred routing to each of a number of defined locations in the indoor environment may include receiving data representative a number of non-location based identifiers; and determining the number of defined locations in the indoor environment corresponding to a respective one of the number of non-location based identifiers, each of the number of defined locations retrieved from a data store indexed using non-location based identifiers and stored at least partially in a nontransitory storage media communicably coupled to the processor. Determining a preferred routing to each of a number of defined locations in the indoor environment may include determining a routing to each of a number of defined locations based on at least one of: the shortest distance between at least a portion of the number of defined locations, the least travel time between at least a portion of the number of defined locations, or the lowest traffic between at least a portion of the number of defined locations. The known location of each of the plurality of beacons may be provided as data representative of the geolocation of the respective beacon, the geolocation data stored in a persistent processor-readable nontransitory storage.

The non-time of flight or time of arrival position location method may further include determining by the processor a geolocation corresponding to the updated receiver location using the data representative of the geolocation of each of the originating beacons.

Determining an initial receiver location may include generating and storing data representative of an initial beacon list in a nontransitory storage medium communicably coupled to the processor, the initial beacon list including for each of the plurality of received signals: data indicative of the signal strength of the received signal and data indicative of the unique identifier associated with the respective originating beacon; and setting the initial receiver location as the location of the originating beacon providing the greatest signal strength at the receiver. Determining a plurality of vector quantities by the processor may include replacing all or a portion of the data representative of the initial beacon list with data representative of an updated beacon list, the data representative of the updated beacon list including for each of the plurality of received signals data indicative of the signal strength of the respective signal and the data indicative of the unique identifier associated with the respective originating beacon.

The non-time of flight or time of arrival position location method may further include purging stale data from the updated beacon list by: removing from the updated beacon list by the processor the signal strength and unique identification data associated with a beacon when the signal strength of the signal provided by the respective beacon fulfills at least one defined removal criterion.

Replacing all or a portion of the data representative of the initial beacon list with data representative of an updated beacon list may include temporally ordering the data included in the updated beacon based at least in part on the order the data was received by the receiver. The processor may purge stale data from the updated beacon list by: removing from the updated beacon list the signal strength and unique identification data associated with a beacon when the signal strength of the signal provided by the respective beacon has not been updated within a defined period of time.

In another embodiment, a non-time of flight or time of arrival position location system may be summarized as including a receiver to receive a plurality of broadcast signals, each of the plurality of received signals characterized by a respective signal strength and by data that uniquely identifies an originating one of a plurality of terrestrial radio frequency beacons positioned in a respective known location within an indoor environment; at least one output device; a processor communicably coupled to the receiver and the at least one output device; processor-executable instructions that cause the processor to: determine an initial receiver location relative to the known locations of at least a portion of the plurality of beacons; for each of a plurality of received broadcast signals, iteratively determine an updated receiver location relative to the known locations of at least a portion of the plurality of beacons by causing the processor to: determine a signal strength of the received signal and detecting the data that uniquely identifies the respective originating beacon; determine a vector quantity associated with each of the plurality of received signals to provide a plurality of vector quantities, the vector quantity for each of the plurality of received signals including at least: a direction coincident with a shortest line between the processor and the known location of the respective originating beacon; and a magnitude based at least in part on the non-temporal based signal strength of the broadcast signal and a distance separating the processor from the respective originating beacon; and sum the plurality of vector quantities by the processor to determine the updated receiver location until a number of consecutive iterations provide updated receiver locations falling within a defined limit; and generate at least one human-perceptible output indicative of the updated receiver location via the at least one output device.

The non-time of flight or time of arrival position location system of may further include a processor-readable nontransitory memory communicably coupled to the processor, the processor-readable nontransitory memory including data indicative of the known location of each of the plurality of beacons.

The data indicative of the known location of each of the plurality of beacons may include data indicative of the geolocation of each of the plurality of beacons; and wherein instructions executable by the processor may further cause the processor to determine a geolocation corresponding to the updated receiver location.

The non-time of flight or time of arrival position location system may further include a processor-readable nontransitory memory communicably coupled to the processor, the processor-readable nontransitory memory including data including a number of defined locations each indexed using at least one respective non-location based identifier; and wherein the processor-executable instructions may further cause the processor to: receive data indicative of a number of nonlocation based identifiers; determine the number of defined locations in the environment, each of the defined locations corresponding to a respective one of the non-location based identifiers; determine a preferred routing to each of the number of defined locations; and generate at least one human-perceptible output indicative of progressive directional information along the preferred routing.

The receiver and the at least one output device may be at least partially disposed in a portable housing, the processor may be disposed remote from the portable housing and the communicable coupling between the receiver, and the at least one output device and the processor may include a wireless communicable coupling. The receiver and the at least one output device and the processor may be collocated and at least partially disposed in a portable housing. The at least one output device may include at least one of: an audio speaker, an audio output interface, a display device, a display output interface, or a touchscreen. To determine an initial receiver location relative to the known locations of at least a portion of the plurality of beacons and for each of a plurality of received broadcast signals, the processor-executable instructions may cause the processor to: generate and store data representative of an initial beacon list in a nontransitory storage medium communicably coupled to the processor, the initial beacon list including for each of the plurality of received signals: data indicative of the signal strength of the received signal and data indicative of the unique identifier associated with the respective originating beacon; and set the initial receiver location equal to the location of the beacon providing the greatest signal strength at the receiver. To determine the vector quantity including a non-temporal based magnitude and a non-temporal based direction associated with each of the plurality of received signals to provide a plurality of vector quantities, the processor-executable instructions may cause the processor to: replace all or a portion of the data representative of the initial beacon list with data representative of an updated beacon list, the data representative of the updated beacon list including for each of the plurality of received signals: data indicative of the signal strength of the respective signal and data indicative of the unique identifier associated with the respective originating beacon. The processor-executable instructions may further cause the processor to: remove the signal strength and unique identification data representative of a beacon from the updated beacon list to purge stale data from the updated beacon list when the signal strength of the signal provided by the respective beacon fulfills at least one defined removal criterion. Each of the plurality of broadcast signals may consist of data that uniquely identifies one of the plurality of terrestrial radio frequency beacons originating the respective signal.

In another embodiment, a non-time of flight or time of arrival position location method may be summarized as including receiving by a receiver communicably coupled to a processor a plurality of broadcast signals, each of the plurality of received signals characterized by a respective signal strength and by data that uniquely identifies an originating one of a plurality of terrestrial radio frequency beacons positioned in respective known locations in an indoor environment; determining an initial receiver location relative to the known locations of at least some of the plurality of beacons by the processor; iteratively determining an updated receiver location relative to the known locations of at least some of the plurality of beacons by: determining a signal strength of the received signal and detecting the data indicative of the unique identifier of the originating beacon for each of the plurality of received signals; determining a vector quantity associated with each of the plurality of received signals to provide a plurality of vector quantities, the vector quantity for each of the respective plurality of received signals including at least: a direction coincident with a shortest line connecting the processor to the known location of the respective originating beacon; and a magnitude based at least in part on the signal strength of the received signal and a distance separating the processor from the respective originating beacon; and summing the resultant plurality of vector quantities to determine the updated receiver location until consecutive iterations provide updated receiver locations falling within a defined limit; and generating at least one human-perceptible output indicative of the updated receiver location via at least one output device communicably coupled to the controller.

The non-time of flight or time of arrival position location method may further include determining a preferred routing to each of a number of defined locations; and generating at least one human-perceptible output indicative of progressive directional information along the preferred routing.

Determining a preferred routing to each of a number of defined locations may include receiving data representative of a number of non-location based identifiers; and determining the number of defined locations within the environment corresponding to a respective one of the number of received nonlocation based identifiers, each of the number of defined locations retrieved from a data store indexed using one or more non-location based identifiers and stored at least partially in a nontransitory storage media communicably coupled to the processor. Determining a preferred routing to each of a number of defined locations may include determining a routing to each of a number of defined locations based on at least one of: the shortest distance between at least a portion of the number of defined locations, the least travel time between at least a portion of the number of defined locations, or the lowest traffic between at least a portion of the number of defined locations.

The non-time of flight or time of arrival position location method may further include determining a geolocation corresponding to the updated receiver location using geolocation data for each of the plurality of beacons, the geolocation data stored in a processor-readable nontransitory memory that is communicably coupled to the processor.

Determining an initial receiver location may include setting the initial receiver location as the location of the originating beacon providing the greatest signal strength at the receiver. Determining an initial receiver location may include generating and storing data representative of an initial beacon list in a nontransitory storage medium communicably coupled to the processor, the initial beacon list including for each of the plurality of received signals: data indicative of the signal strength of the received signal and data indicative of the unique identifier associated with the respective originating beacon; and setting the initial receiver location as the location of the originating beacon providing the greatest signal strength at the receiver. Determining a plurality of vector quantities by the processor may include replacing all or a portion of the data representative of the initial beacon list with data representative of an updated beacon list, the data representative of the updated beacon list including for each of the plurality of received signals data indicative of the signal strength of the respective signal and the data indicative of the unique identifier associated with the respective originating beacon.

The non-time of flight or time of arrival position location method may further include purging stale data from the updated beacon list by removing from the updated beacon list by the processor the signal strength and unique identification data associated with a beacon when the signal strength of the signal provided by the respective beacon fulfills at least one defined removal criterion.

Replacing all or a portion of the data representative of the initial beacon list with data representative of an updated beacon list may include temporally ordering the data included in the updated beacon based at least in part on the order the data was received by the receiver.

The non-time of flight or time of arrival position location method may further include purging stale data from the updated beacon list by removing from the updated beacon list the signal strength and unique identification data associated with a beacon when the signal strength of the signal provided by the respective beacon has not been updated within a defined period of time.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE EMBODIMENTS

Figure 1A:
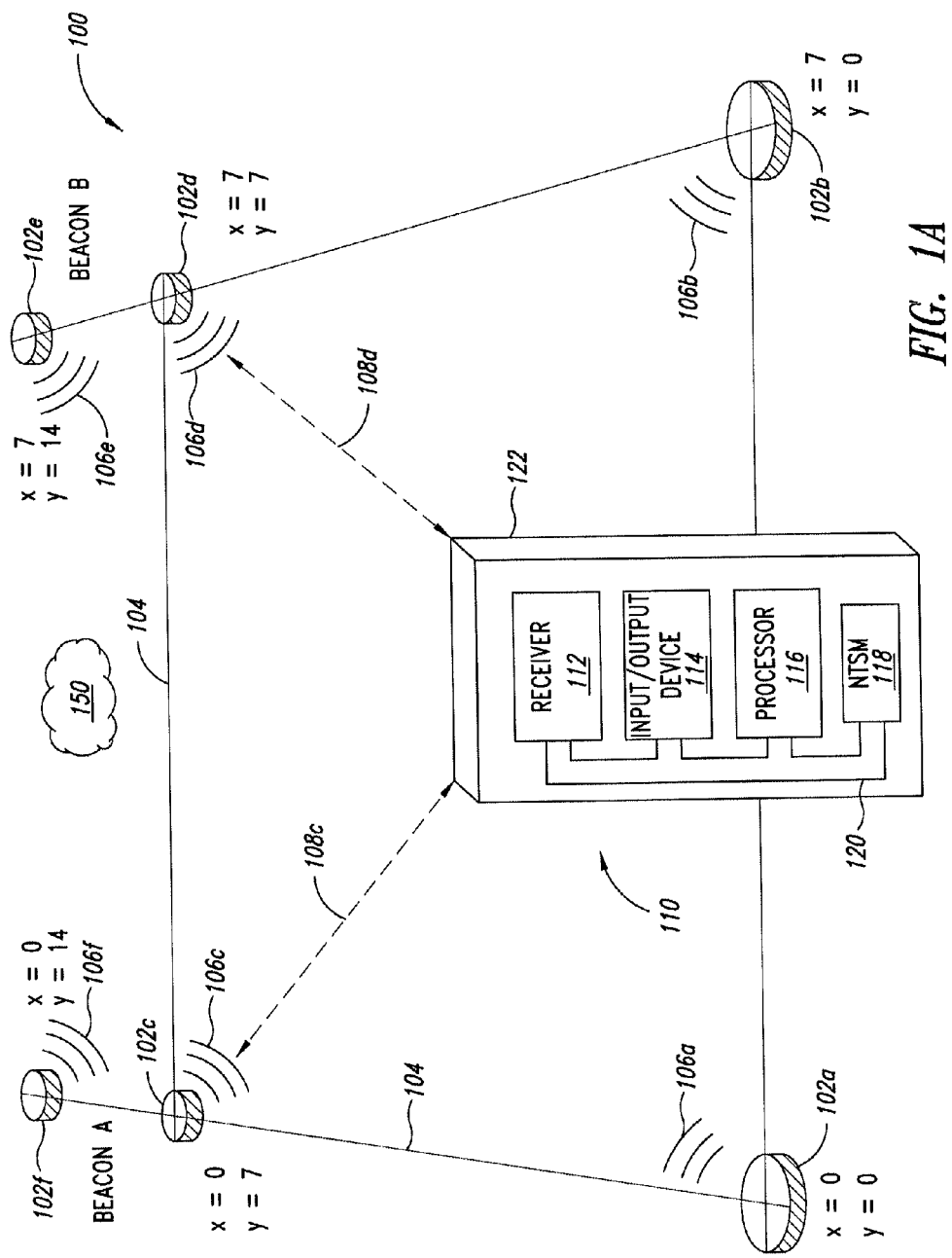
FIG. 1A is a schematic diagram illustrating an example indoor or covered environment in which a position location system including a handheld electronic device communicably coupled to a local processor and a number of fixed beacons each generating a respective broadcast signal having a received signal strength and containing a unique identifier are used to determine a location within the environment, according to one non-limiting illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. Communications systems and protocols that are well known to those of skill in the communications arts or are readily available in the form of standards or similar guidance documents, including but not limited to, the Global Positioning System ("GPS"), Bluetooth, IEEE 802.11 a/b/g/n ("WiFi"), Near Field Communications ("NFC"), ANT, ANT+, and the like have not been shown or described in detail to avoid unnecessarily obscuring descriptions of the embodiments. Additionally, time-of-flight, time-of-arrival, or differential time-of arrival based position or location determination methods that are well known to those of skill in the communications arts including trilateration used by GPS receivers and multilateration used by cellular devices have not been shown or described in detail herein. Additionally, detailed specifications of well known electronic components such as receivers, transceivers, processors, nontransitory storage or memory, communication and/or switching protocols and the like have not been shown or described in detail.

Unless the context requires otherwise, throughout the specification and claims which follow, the word "comprise" and variations thereof, such as "comprises" and "comprising," are to be construed in an open, inclusive sense that is as "including, but not limited to."

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise. Reference throughout this specification to "one embodiment" or "an embodiment" means that a particular feature, structure or characteristic described in connection with the embodiment is included in at least one embodiment. Thus, the appearances of the phrases "in one embodiment"

or "in an embodiment" in various places throughout this specification are not necessarily all referring to the same embodiment.

Furthermore, the particular features, structures, or characteristics may be combined in any suitable manner in one or more embodiments.

The headings and Abstract of the Disclosure provided herein are for convenience only and do not interpret the scope or meaning of the embodiments.

FIG. 1 shows a number of beacons 102a-102f (collectively "number of beacons 102" or "beacons 102") positioned in an arrangement 104 that is useful for providing a position location system in an enclosed, indoor, or covered environment 150. A handheld electronic device 110 may be used to receive a number of broadcast signals 106a-106f (collectively "broadcast signals 106") generated by each of the respective number of beacons 102a-102f to determine a user's position or location relative to at least some of the number of beacons 102. In at least some implementations, the broadcast signals 106 may consist only of an identifier unique to the respective beacon 102a-102f that is transmitted on a periodic or intermittent basis. The beacons 102 may be positioned in any symmetric, asymmetric, or combination arrangement 104 that falls partially or completely within the enclosed, indoor, or covered environment 150. Advantageously, in such enclosed, indoor, or covered environments 150, the position location system 100 is able to provide a reliable, low cost, and accurate location to a user while other positioning systems such as GPS either provide highly uncertain position information to the user or are unable to provide any position information to the user.

Each of the number of beacons 102 can include one or more systems, devices, or combinations thereof capable of providing a respective broadcast signal 106 on an aperiodic or periodic basis. In at least some implementations, the broadcast signal may include data representative of a unique identifier that is programmed in, stored in, associated with or otherwise assigned to the respective originating beacon 102. In at least some implementations, the broadcast signal 106 can consist of only data indicative of the unique identifier that is programmed in, stored in, associated with or otherwise assigned to the respective originating beacon 102. In other implementations, the broadcast signal 106 may include data, not including temporal or similar time-based data, in addition to the unique identifier that is programmed in, stored in, associated with or otherwise assigned to the respective originating beacon 102.

In some instances, the unique identifier that is programmed in, stored in, associated with or otherwise assigned to the respective originating beacon 102 may include a unique alphanumeric character string that mayor may not include additional ASCII characters or spaces. The unique identifier may be assigned to each of the number of beacons 102 at any time from manufacture to start-up of the position location system 100. For example, the unique identifier may be assigned to the beacon 102 at the time of manufacture, assembly, installation, or start-up. In at least some situations, at least a portion of the unique identifier provided in the broadcast signal 106 generated by a respective beacon 102 may include data corresponding at least in part to the geolocation of the beacon 102 originating the broadcast signal. In some situations, all or a portion of the broadcast signal 106 generated by the beacon 102 may be encrypted, encoded, or otherwise protected. In at least some instances, the broadcast signal may be regularly, periodically repeated or transmitted at an interval of about 1 second or less; about 2 seconds or less; about 5 seconds or less; about 10 seconds or less; or about 30 seconds or less.

Each of the number of beacons 102 may be line powered or powered by removable or rechargeable power cells such as batteries, ultracapacitors, or the like. Where line powered beacons 102 are used to provide at least a portion of the position location system 100, the beacons may optionally communicate with each other or one or more centralized locations (e.g., server, monitoring station, etc.) via power-line networking, for example via Zigbee@link. In at least some instances, battery or ultracapacitor powered beacons 102 may be used to establish position location networks in fluid or dynamic environments where wired systems are either impossible or impractical to implement. Such environments may include, but are not limited to, reconfigurable offices, modular buildings, mines, tunnels, and other similar locations.

Each of the beacons 102 can include any number transmitters, wireless interfaces, devices, systems, or combinations thereof that are capable of generating and transmitting a broadcast signal 106n that includes data representative of the unique identifier associated with the respective originating beacon 102n. In at least some implementations, each of the beacons 102 may include a signal generator and a transmitter or a transceiver that is capable generating and transmitting a broadcast signal 106n consisting only data indicative of the unique identifier associated with the originating beacon 102n. In other implementations, the signal generator and transmitters or transceivers may optionally generate and broadcast a broadcast signal 106n that contains data other than the unique identifier that is programmed in, stored in, associated with or otherwise assigned to the respective originating beacon 102n. For example, in at least some instances, the signal generator and transmitter in some or all of the beacons 102 may transmit data indicative of the physical location or position of the respective beacon 102n within the enclosed, indoor, or covered environment 150.

In at least some instances, the wireless interface or gateway in each of the number of beacons 102 may include, but is not limited to: a ZigBee® compliant interface or gateway; a Bluetooth® or Bluetooth® LE compliant interface or gateway; an IEEE 802.11 ("WiFi") compliant interface or gateway; or the like. In at least one instance, the position location systems 100 can include a number of ANT or ANT+ beacons 102 that employ a proprietary communications protocol developed by Dynastream Innovations Inc., of Cochrane, Canada.

The number of beacons 102 may be disposed in any symmetric, partially symmetric, or asymmetric physical configuration or arrangement 104 that lies at least partially within an enclosed, indoor or covered environment. Such arrangements 104 may include one or more predetermined arrangements, for example each of the number of beacons 102 may be positioned such that a regular rectangular grid arrangement 104, or such that a regular radial grid arrangement 104 is formed on the ceiling of an indoor or covered environment. In at least one instance the number of beacons 102 can include a number of ANT+ beacons disposed in a ceiling mounted seven (7) meter square grid pattern arrangement 104. In at least some instances, any number of the beacons 102 may be permanently or temporarily affixed, mounted, positioned, or otherwise attached to various structures found in enclosed, indoor, or covered environments 150. Such structures may include, but are not limited to walls, floors, ceilings, partitions, structural members, shelving, or the like. Attachment of the beacons 102 to a ceiling, for example, advantageously places the beacons 102 in an out of the way location where power is typically available, broadcast signal range is maximized and broadcast signal obstructions are minimized. The beacons 102 may be placed in any indoor environment where position location data may be of value and includes without limitation, industrial facilities, warehouses, retail establishments, commercial establishments, entertainment venues, sports arenas, and the like.

After being positioning in a suitable arrangement 104, the geometric relationship between each of the number of beacons 102 can be determined and each of the beacons 102 may be uniquely mapped to a specific location existent within the enclosed, indoor, or covered environment 150. The relationship between each of the number of beacons 102 may be defined on either a relative or an absolute basis. Example relative bases include, but are not limited to: the geometric relationship existent between some or all of the beacons 102 (e.g., 8 meters west and 10 meters north of beacon 1 A 1); the geometric relationship existent between a defined grid or other defined pattern and some or all of the beacons 102 (e.g., at defined grid location 2F); or the geometric relationship between some or all of the beacons 102 and the surrounding enclosed, indoor or covered environment 150 in which the beacons 102 are positioned (e.g., at warehouse bay 5E or "Mary's Office"). An example absolute measure includes defining the geometric relationship between some or all of the beacons 102 by determining the latitude and longitude corresponding to the location of each beacon 102. In at least some instances, such location or position information may be stored in a nontransitory memory disposed within each of the beacons 102. In other instances, the location or position information for each beacon 102 in the arrangement 104 (e.g., Beacon 10: 1A00001, X=0, Y=0; or Beacon 101 A00001, r=0, $\phi=90°$) may be stored in a nontransitory memory disposed remote from the beacons 102 that is accessible to and at least readable by the receiver 110.

The use of a system based on such relationships advantageously permits the definition of any location within the enclosed, indoor, or covered environment 150 in terms of either the beacons or the geometric relationship between the beacons (e.g., location "warehouse bay 4" is 2 meters west of beacon 1A00001 and 2 meters east of beacon 1A00002; beacon 2B01781 is in office 3A12; etc.). By storing relational information linking search objects and locations (e.g., "corn flakes=warehouse bay 4" or "Ms. Jones=office 3A12") in a nontransitory storage that is accessible to and at least readable by the receiver 110, a user is able to search for a particular object in more familiar or colloquial terms (e.g., "corn flakes" or "Ms. Jones") and the position location system 100 may respond with a particular location where the object of the search may be found.

The handheld electronic device 110 can include any system, device, or combination of systems and devices able to receive the broadcast signals 106 provided by the beacons 102. The handheld electronic device 110 can include a receiver 112, an input/output ("I/O") interface 114, at least one processor 116, and a nontransitory storage 118. In at least some instances, as depicted in FIG. 1 A at least a portion of the at least one processor 116 and the nontransitory storage 118 may be disposed local to the handheld electronic device 110. In other instances, as depicted in FIG. 1 B at least a portion of the at least one processor 116 and the nontransitory storage 118 may be communicably coupled to, but disposed remote from, the handheld electronic device 110. In other instances the at least one processor 116 and the nontransitory storage 118 may be partially disposed local to the handheld electronic device 110 and partially disposed remote from the handheld electronic device 110, for example the at least one processor 116 may be disposed local to the handheld electronic device 110 while all or a portion of the nontransitory storage 118 may be disposed remote from the receiver, for example at a central data store. The components forming the handheld electronic device 110 may be communicably coupled via one or more data buses 120. The components may be at least partially disposed within a housing 122.

In some implementations, the handheld electronic device 110 may optionally include a network interface 160 as shown in FIG. 1 B. The network interface 160 is useful for communicating with one or more external electronic components, systems or devices via a network 130 such as a local area network, wide area network, or the Internet. In other implementations, the handheld electronic device 110 may optionally include a processor 116, nontransitory storage 118, and a network interface as shown in FIG. 1 C. In such instances, the network interface 160 may be communicably coupled to one or more centralized systems 170 via the network 130. Such centralized systems 170 may contain nontransitory storage 180 and a user interface 182 useful for maintaining and updating the handheld electronic devices 110.

The receiver 112 can include one or more interfaces, devices, systems, or combinations thereof that are capable of analog or digital unidirectional or bidirectional wireless communication with one or more external devices such as the number of beacons 102. Such communication may occur acoustically (e.g., ultrasonically) or electromagnetically (e.g., radio frequency, near infrared, etc.). Although primarily intended to receive the broadcast signals 106 provided by the number of beacons 102, the receiver 112 may in some instances include one or more integrated transmitters (i.e., a transceiver) or may include one or more stand alone transmitters that are not depicted in the handheld electronic device 110 shown in FIGS. 1A-1 C. The receiver 112 may include one or more amplifiers, filters, signal processors, and the like to extract at least the data representative of the unique identifier that is programmed in, stored in, associated with or otherwise assigned to the respective originating beacon 102. The receiver 112 may additionally include one or more systems or devices capable of assessing and assigning a value indicative of received signal strength ("RSSI") of the received broadcast signal 106 generated by each of the originating beacons 102. In at least some instances, the receiver 112 can communicate to the at least one processor 116 via the one or more data buses 120 at least a portion of the data obtained from the broadcast signal 106. The data so communicated may include, but is not limited to, the unique identifier representative of the originating beacon 102 along with data indicative of the RSSI value of the respective broadcast signal 106 supplying the unique identifier.

The input/output interface 114 can include one or more interfaces capable of providing at least a human-perceptible output indicative of the location of the handheld electronic device 110. In at least some implementations, such output may provide the user with a location relative to the arrangement 104 of the beacons 102, a location relative to the arrangement 104, or a location relative to the enclosed, indoor, or covered location 150. In other implementations, such output may provide the user with an absolute location such as a longitude and latitude. In at least some instances, at least a portion of the I/O interface 114 may optionally include an interface capable of accepting user input. Such a user input interface may include, but is not limited to, a physical or virtual keyboard, buttons switches, knobs, dials, touchscreen, microphone, motion sensors, accelerometers, or combinations thereof.

In operation, the I/O interface 114 can include a display output to indicate the location of the handheld electronic device 110 in relative terms with respect to at least some of the number of beacons 102, the arrangement 104, the enclosed, indoor or covered environment 150, or in absolute terms such as longitude and latitude. The location of the handheld electronic device 110 with respect to at least some of the beacons 102 may be variously displayed on the I/O interface 114 in a graphical format, in a text format, or as a combination of graphical and text formats. The I/O interface 114 may incorporate any display technology including, but not limited to, a liquid crystal display (LCD), a light emitting diode (LED) display, an organic LED (OLEO) display, a polymer LED (PLED) display, an ePaper display, or similar. In at least someinstances, all or a portion of the I/O interface 114 can include a resistive or capacitive touchscreen. In at least some implementations, the handheld electronic device 110 may include an attached or built-in stylus or similar device to facilitate the provision of input by a user. Where the handheld electronic device 110 is battery powered, a low power consumption I/O interface 114 may be preferred to increase expected battery life.

The at least one processor 116 may be disposed locally in the handheld electronic device 110 as shown in FIGS. 1 A and 1 C, remote from the handheld electronic device 110 as shown in FIG. 1 B, or any combination thereof. The at least one processor 116 may take any of a variety of forms, for example a single or multiple core microcontroller or microprocessor, a programmable gate array (PGA), an application specific integrated circuit (ASIC), a digital signal processor (DSP), a programmable logic controller (PLC), or the like. The at least one processor 116 may provide very limited computing power, for example an 8-bit microcontroller may provide sufficient speed and computing capacity to determine the location of the handheld electronic device 110 with respect to the arrangement 104 of beacons 102.

In at least some implementations, the at least one processor 116 may be communicatively coupled to receive data directly from the receiver 112. In some instances, the at least one processor 116 may include limited internal or onboard nontransitory storage (not shown). In other implementations, the at least one processor 116 may be provided using one or more central processing units or CPUs disposed in a tablet computer, handheld computer, personal digital assistant, laptop computer, ultraportable computer, or smartphone. In at least some implementations, a persistent nontransitory memory containing machine executable instructions including one or more operating systems may be communicably coupled to or at least partially embedded within the at least one processor 116.

Figure 1B:
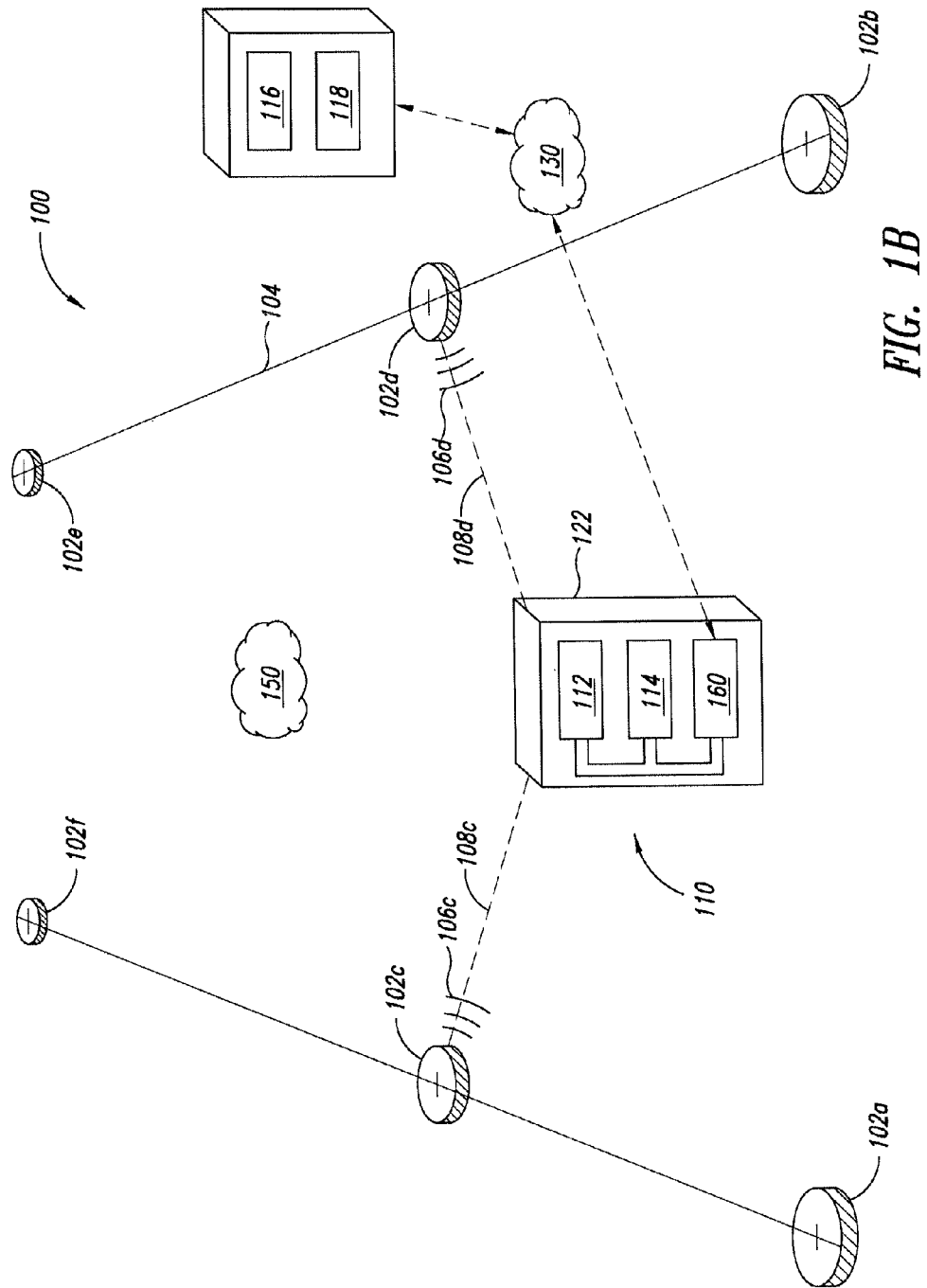
FIG. 1B is a schematic diagram illustrating another example indoor or covered environment in which a position location system including a handheld electronic device communicably coupled via a network to a remote processor and a number of fixed beacons each generating a respective broadcast signal having a received signal strength and containing a unique identifier are used to determine a location within the environment, according to one non-limiting illustrated embodiment.
Figure 1C:
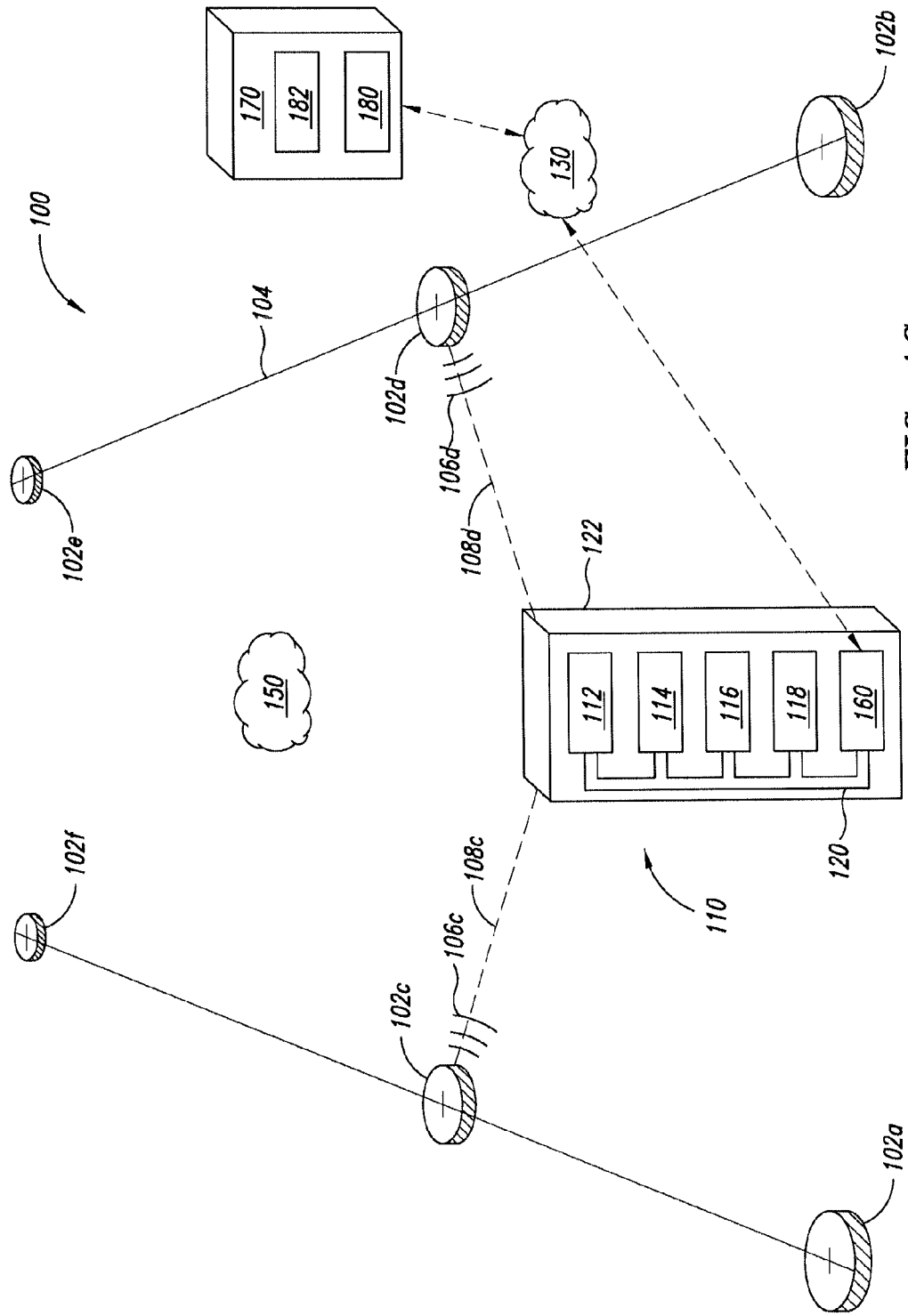
FIG. 1C is a schematic diagram illustrating another example indoor or covered environment in which a position location system including a handheld electronic device communicably coupled via a network to a centralized data store and a number of fixed beacons each generating a respective broadcast signal having a received signal strength and containing a unique identifier are used to determine a location within the environment, according to one non-limiting illustrated embodiment.

The nontransitory storage 118 may be disposed locally in the handheld electronic device 110 as shown in FIGS. 1A and 1C, remote from the handheld electronic device 110 as shown in FIG. 1B, or any combination thereof. In at least some implementations, all or a portion of the nontransitory storage 118 may include removable nontransitory storage. Such removable nontransitory storage may include any current or future developed nonvolatile, removable, storage media including, but not limited to, a secure digital (SO, SOHC, SOXC) card, a mini-SO card, a micro-SO card, a compact flash (CF) card, a universal serial bus (USB) flash drive, a memory stick, an external magnetic, optical, or molecular rotating or solid state drive, or the like. At least a portion of the nontransitory storage 118 may be co-resident with or resident in the at least one processor 116.

At least a portion of the nontransitory storage 118 may include a rewriteable storage useful for storing data representative of the unique identifiers associated with each the beacons 102 along with the relative or absolute positional information associated with each of the respective beacons 102. Such data may be placed or otherwise stored in the nontransitory storage at the time of manufacture, purchase, installation, or startup of the position location system 100. In at least some implementations, a data store storing or otherwise retaining data indicative of physical locations within the enclosed, indoor, or covered environment 150 indexed at least in part by colloquial search terms may be stored or otherwise retained in at least a portion of the nontransitory storage 118. In other implementations, a data store storing or otherwise retaining data representative of the unique identifiers that are programmed in, stored in, associated with or otherwise assigned to the respective beacons 102 indexed at least in part by colloquial search terms may be stored or otherwise retained in at least a portion of the nontransitory storage 118.

In operation, each of the broadcast signals 106 received by the receiver 112 will have an RSSI value corresponding to the received signal strength and will include data at least indicative of the unique identifier associated with the originating beacon 102. Based on the unique identifiers, the at least one processor 116 can retrieve from the nontransitory storage 118 the location of each of the beacons 102 from which a signal has been received. By using an assumed or known location of the handheld electronic device 110, the processor 116 may determine both a distance and a direction between the respective beacon 102 and the receiver 112. Using the determined distance and direction between the receiver 112 and a number of beacons 102, the processor 116 determines a respective vector quantity for each beacon 102 from which a broadcast signal 106 was received. Each of the determined vector quantities is characterized by a direction coincident with the determined, straight-line, direction between the receiver 112 and the respective originating beacon 102 and a magnitude using the determined distance between the receiver 112 and the respective originating beacon 102. The at least one processor 116 can iteratively determine and sum the resultant vector quantities from each of the beacons 102 from which a broadcast signal 106 was received to determine an updated location corresponding to the location of the receiver 112 with respect to the arrangement 104 of beacons 102. The iterative determination of the vector quantity corresponding to each of the received broadcast signals and the calculation of the vector sum can be repeated until consecutive summations provide a receiver 112 location falling within one or more defined thresholds.

In at least some instances, the handheld electronic device 110 can include at least one wired or wireless network interface 160. In at least some implementations, the at least one network interface 160 can be used to communicably couple the handheld electronic device 110 to the at least one remote processor 116, the nontransitory storage 118, or combinations thereof. By disposing the at least one processor 116 and the nontransitory storage at a remote location, the complexity and cost of the handheld electronic device 110 can be reduced. Advantageously, if the at least one processor 116 and the nontransitory storage 118 are located in a location shared by two or more handheld electronic devices 100, object, location, and beacon identification data can be updated and maintained in fewer locations, than if each handheld electronic device 110 is equipped with at least one processor 116 and nontransitory storage 118.

Alternatively as shown in FIG. 1C, the handheld electronic device 110 can include the at least one processor 116, a nontransitory storage 118, and at least one network interface 160 in addition to the receiver 112 and the I/O interface 114. In some instances updates to object, location, and beacon identification data stored in the data store in the nontransitory storage 118 may be pushed by a centralized controller 170 from a centralized data store in a centralized nontransitory storage 180 to the one or more handheld electronic devices 110. In other instances, updates to object, location, and beacon identification data stored in the data store in the nontransitory storage 118 may be pulled by the one or more handheld electronic devices 110 from the centralized nontransitory storage 180 via the controller 170. In at least some instances, updates to the centralized data store in the centralized nontransitory storage 180 may be made via a user interface 182 communicably coupled to the centralized controller 170.

In at least some instances, the handheld electronic device 110 can be a dedicated device capable only of communication with some or all of the number of beacons 102 and optionally, one or more wiredly or wirelessly connected external electronic devices such as the processor 160 or the controller 170. In such instances, the handheld electronic device 110 may be provided as part of an integrated system that includes the beacons 102 and any necessary peripheral equipment and networking infrastructure required to provide a fully functional position location system 100 for use in an enclosed, indoor or covered environment 150. In other instances, the handheld electronic device 110 can include a tablet computer, handheld computer, portable computer, or smartphone that is capable of direct communication with all or a portion of the beacons 102 or that may be communicably coupled to one or more peripheral devices (e.g., wireless interfaces) that are capable of direct communication with the beacons 102. In instances where a tablet computer, handheld computer, portable computer, or smartphone is used as the handheld electronic device 110, software providing the position location capability and user interface may be acquired as an application or "app" via one or more public or private application marketplaces.

Figure 2:
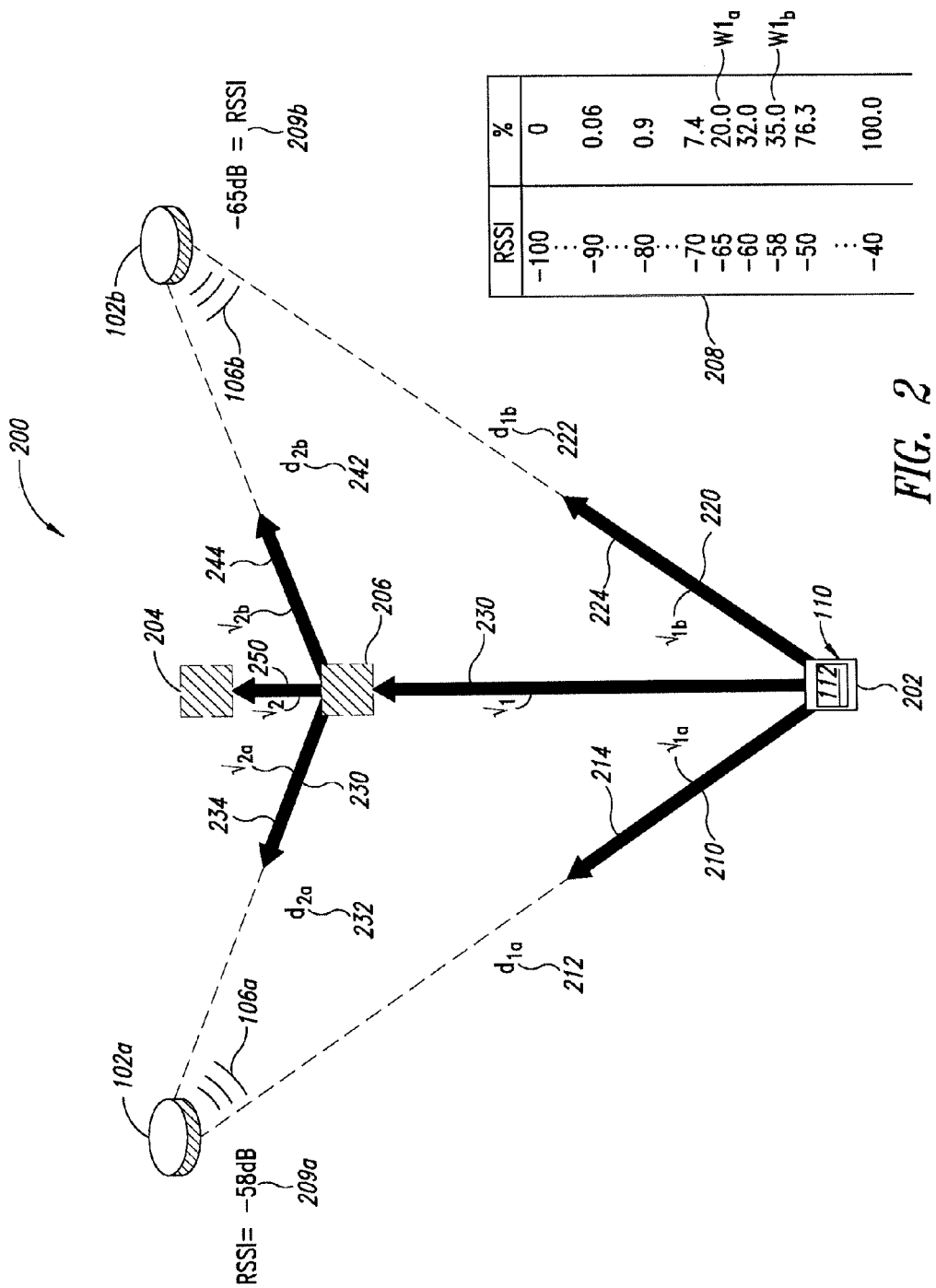
FIG. 2 is a schematic diagram graphically depicting an example position location determination in an indoor or covered environment in which the position of a handheld electronic device is determined with respect to a number of beacons using at least one of the position location systems of FIGS. 1A-1C, according to one non-limiting illustrated embodiment.

The position location method employed by the position location system 100 is graphically illustrated in FIG. 2. From an arbitrary or defined selected "initial position" 202, the actual position 204 of the handheld electronic device 110 is located by iteratively determining a number of intermediate positions 206. The intermediate positions 206 are determined by summing a number of vector quantities (214 and 224 on the first iteration; 234 and 244 on the second iteration, in the illustrated example). Each of the vector quantities are characterized using at least the distance and direction between the location of the handheld electronic device 110 and the respective originating beacon 102a, 102b and the RSSI value of the broadcast signal 106a, 106b received from the respective originating beacon 102a, 102b.

The initial position 202 can be arbitrarily selected or defined as any point having a known position with respect to at least some of the number of beacons 102. In some implementations, the initial position 202 may be an arbitrarily selected or defined fixed point having a known position with regard to at least some of the beacons 102 or with respect to the arrangement 104. In other implementations, the initial position 202 may be defined as corresponding to the location of the originating beacon of the broadcast signal 106 providing the greatest RSSI value at the receiver 112. Regardless of the method used to determine the initial position 202, at least some of the broadcast signals 106a, 106b are received by the receiver 112 in the handheld electronic device 110. Each of the received broadcast signals 106a, 106b will have a respective RSSI value 209a, 209b. In the example depicted in FIG. 2, broadcast signal 106a has −58 dB RSSI value 209a while broadcast signal 106b has a −65 dB RSSI value 209b.

The receiver 112 can extract or otherwise provides data indicative of the unique identifier for beacon 102a from the received broadcast signal 106a along with the RSSI value for broadcast signal 106a and data indicative of the unique identifier for beacon 102b along with the RSSI value for broadcast signal 106b to the processor 116. In at least some implementations, using data retrieved from the nontransitory storage 118, the processor 116 first determines geometric data relating the initial position 202 of the handheld electronic device 110 and the position of each of the beacons 102a, 102b. Such geometric data may include at a minimum, the direction 210, 220 of vectors between the handheld electronic device 110 and beacons 102a and 102b, respectively. Such geometric data may also include at a minimum the distance 212, 222 separating the handheld electronic device 110 and the beacons 102a and 102b, respectively.

For each received broadcast signal 106a, 106b, the processor 116 can retrieve a weighting factor from a data store 208 that is retained or otherwise stored in whole or in part in the nontransitory storage 118. In at least some implementations, the weighting factors in the data store 208 are based at least in part on the RSSI value of the broadcast signal (e.g., providing a multiplier, percentage or similar weighting factor based on the RSSI value of the respective broadcast signal 106n). In at least some instances, the weighting factor data stored in the data store 208 may be dependent upon the arrangement 104 of the beacons 102. For example, the weighting factor data retained or otherwise stored in the data store 208 may be dependent at least upon the physical configuration and spacing of the beacons 102.

For signal 106a having an RSSI value of -58 dB, a weighting factor retrieved by the processor 116 from the data store 208 may be approximately 35%. For signal 106b having an RSSI value of −65 dB, a weighting factor retrieved by the processor 116 from the data store 208 may be approximately 20%. The distances 212, 222 separating the handheld electronic device 110 and each of the beacons 102a, 102b are multiplied by the respective weighting factor retrieved from the data store 208 by the processor 116 to provide the magnitude of the vector quantity. To determine the magnitude of vector 214 ("U1a") the distance 212 ("D1a") is multiplied in the processor 118 by the retrieved weighting factor ("W1a") of 35%. To determine the magnitude of the vector 224 ("U1b") the distance 222 ("D1b") is multiplied in the processor 118 by the retrieved weighting factor ("W1b") of 20%. Thus, in at least some implementations, the magnitude and direction of vector quantities 214 and 224 are autonomously determined by the processor 116 using only the RSSI value of the received broadcast signal 106a, 106b and the location of the originating beacons 102a, 102b. Although described using only two vector quantities for simplicity and ease of discussion, one of ordinary skill in the art can appreciate that the magnitude and direction of any such number of vector quantities corresponding to broadcast signals 106a-106n received from a corresponding number of beacons 102a-102n may be similarly determined using only the RSSI value of the respective received broadcast signal 106.

After determining vector quantities for each of the received broadcast signals 106, the processor 116 sums the vector quantities to determine a resultant vector 230 ("V1"). The initial position of the handheld electronic device 110 is updated by displacing the initial location 202 of the handheld electronic device 110 to the updated location 206 arrived at using the resultant vector 230. Once again, using data stored in the nontransitory storage 118, the processor 116 determines geometric data relating the updated position 206 of the handheld electronic device 110 and the position of each of the beacons 102a, 102b. Such geometric data again includes at a minimum, an updated direction 230, 240 of vectors connecting the updated position 206 of the handheld electronic device 110 and beacons 102a and 102b, respectively. Such geometric data also includes at a minimum an updated distance 232, 242 separating the updated position 206 of the handheld electronic device 110 and the beacons 102a and 102b, respectively.

Since only the arbitrarily selected or defined initial location 202 of the handheld electronic device 110 has changed while the actual location 204 of the handheld electronic device has not changed, the RSSI values and beacon identification information received by the receiver 112 will not change. Thus, signal 106a will continue to have an RSSI value of −58 dB and a weighting factor of approximately 35% and signal 106b will continue to have an RSSI value of −65dB and a weighting factor of approximately 20%. The distances 232, 242 separating the updated position 206 and each of the beacons 102a, 102b are multiplied by the respective weighting factors retrieved from the data store 208 to provide an updated magnitude for each of the respective vector quantities. To determine the magnitude of vector 234 ("U2a") the distance 232 ("D2a") is multiplied in the processor 118 by weighting factor of 35%. To determine the magnitude of the vector 244 ("U2b") the distance 242 ("D2b") is multiplied in the processor 118 by the weighting factor of 20%.

After again determining vector quantities for each of the received broadcast signals 106, the processor 116 can sum the vector quantities to determine a resultant vector 250 ("V2"). The updated position 206 is arrived at by displacing the initial location 206 of the handheld electronic device 110 to an updated location arrived at using the resultant vector 250. The iterative process of determining an updated position of the handheld electronic device 110 using vector quantities determined using the RSSI of the received broadcast signals 106 is repeated until the updated position provided by the vector summation falls within a defined threshold on consecutive iterations. In at least some implementations, the defined threshold may be expressed as a percentage of the magnitude of the resultant vector determined using the vector quantities (e.g., magnitude of the resultant vector changes by less than a defined percentage, for example 5%, on consecutive iterations). In at least some implementations, the defined threshold may be expressed as a magnitude of the resultant vector determined using the vector quantities (e.g., magnitude of the resultant vector changes by less than a defined distance unit, for example 1 meter, on consecutive iterations). In at least some implementations the defined threshold may be expressed as a change in the updated position of the handheld electronic device (e.g., the updated position of the handheld electronic device is within a defined distance unit, for example 1 meter, in each direction on consecutive iterations). In at least some instances, the defined threshold may be established based on one or more external factors, for example the allowable dimensional tolerance of a particular object in a manufacturing process.

Figure 3:
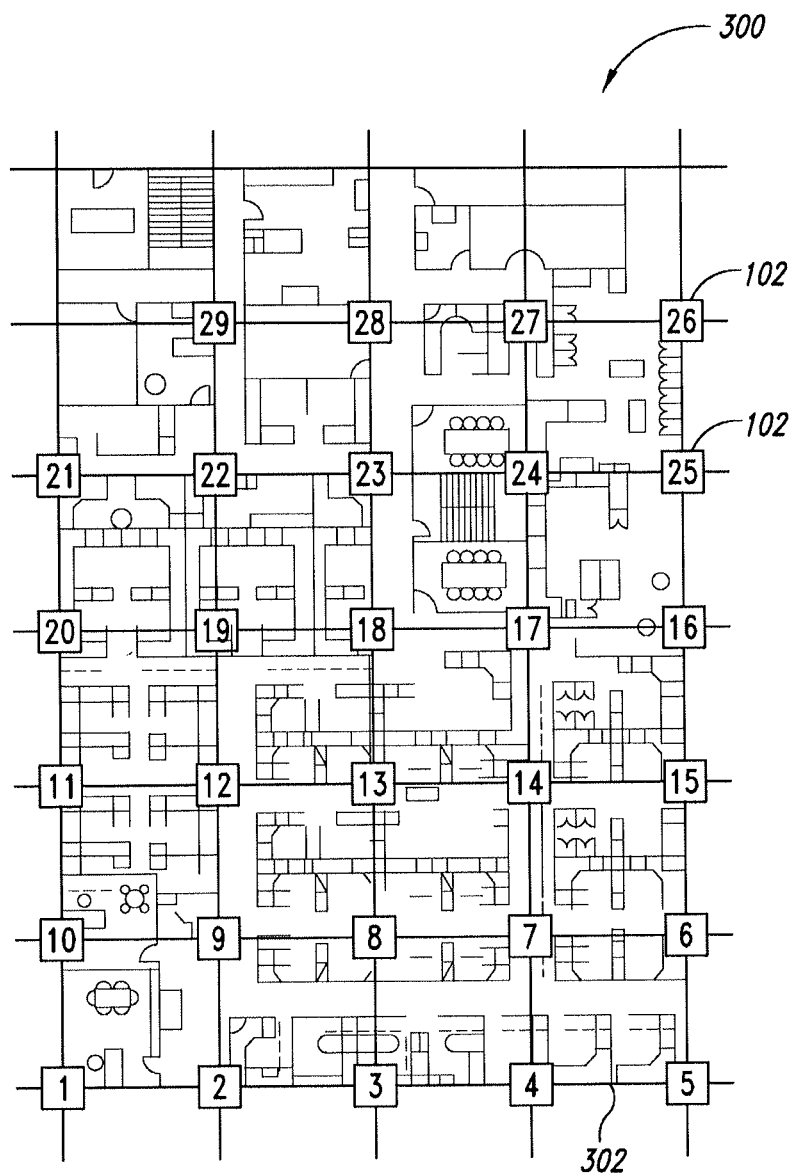
FIG. 3 is a plan view of an example beacon network useful for providing a position location system within an illustrative indoor environment, according to one non-limiting illustrated embodiment.

An illustrative beacon arrangement 300 is shown in FIG. 3. The beacons 102 can be disposed in an arrangement 104 formed along a regular grid pattern 302. Any spacing interval may be maintained in the grid pattern 302. For example a spacing interval of about 1 meter or less; about 2 meters or less; about 10 meters or less; about 15 meters or less; about 20 meters or less; about 25 meters or less; about 30 meters or less; or about 50 meters or less may be used. In at least one implementation a square grid pattern 302 having a spacing of seven (7) meters was found effective when using ANT+ transmitters to provide the number of beacons 102.

Figure 4:
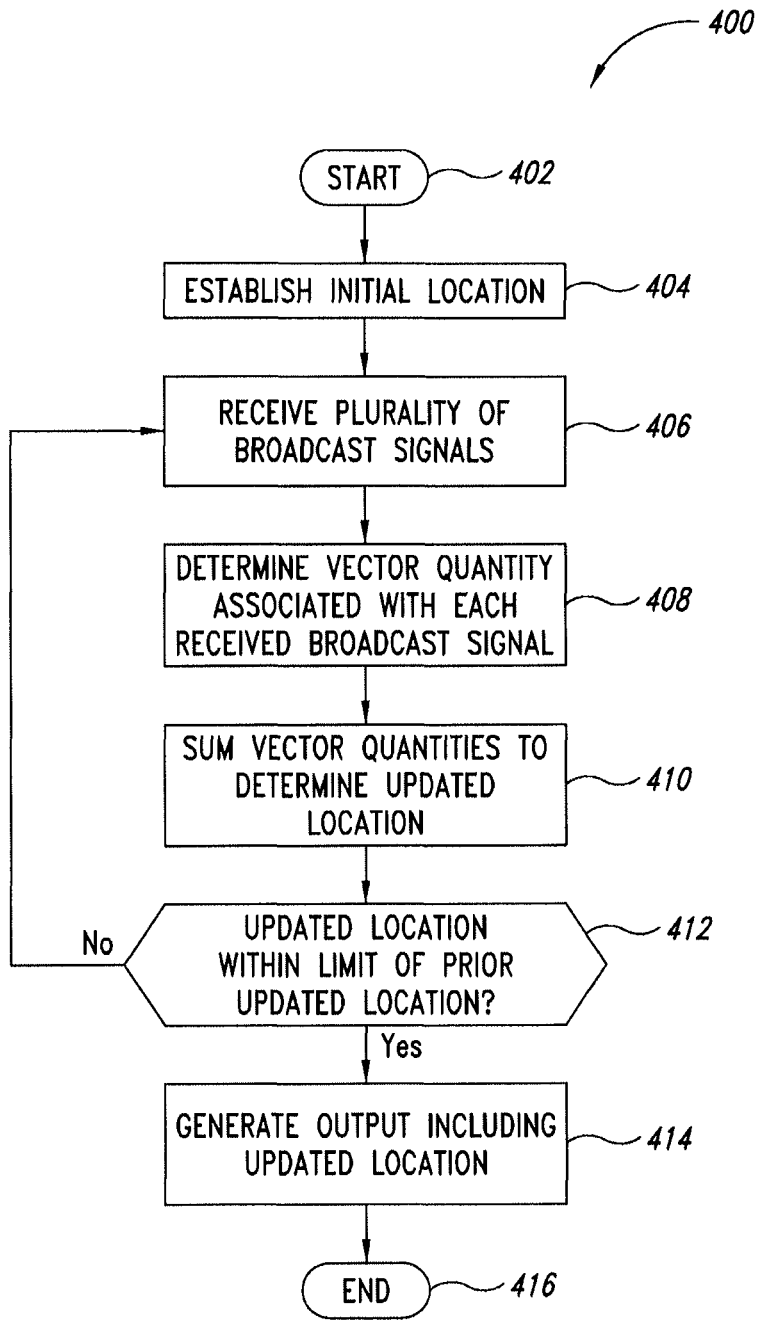
FIG. 4 is a high level logic flow diagram of an illustrative method for determining an updated location of a receiver using a non-time of flight indoor position location system, according to one non-limiting illustrated embodiment.

RSSI balancing provides one method for determining the location of the handheld electronic device 110 using only the received signal strength of broadcast signals received from a plurality of beacons. As shown in FIG. 4, the RSSI balancing method 400 uses the measured RSSI values of a number of beacons 102a-102n and takes advantage of the known location of each of the number of originating beacons 102 to determine a number of vector quantities. Each of the vector quantities 106 is characterized using only the RSSI value and the known location of the respective originating beacon 102. Each of the determined vector quantities includes both a magnitude determined using the RSSI of the signal and a direction determined using the location information of the originating beacon. The number of vector quantities are iteratively determined and summed to provide a single resultant vector that is used to translate the location of the receiver 112. When the translation of the receiver 112 falls below a defined threshold, the position of the handheld electronic device 110 has been determined with respect to at least some of the beacons 102. Where the location of the beacons 102 is provided in absolute reference coordinates (e.g., longitude an latitude) the absolute coordinates of the handheld electronic device 110 can be determined. The RSSI balancing method commences at 402.

At 404 the processor 116 determines an initial location of the receiver 112 with respect to at least some of the number of beacons 102. The determined initial location may be arbitrarily set and can include any location that can be related to at least some of the number of beacons 102. In at least some implementations, the determined initial location can be a known, fixed, location that is proximate or within the arrangement 104 of beacons 102 (e.g., the geometric center of the arrangement 104, one corner of the arrangement 104, a midpoint on the side of the arrangement 104, the location of a specific beacon 102 within the arrangement, etc.). In at least some implementations, the determined initial location may be a variable location that is established using one or more defined criteria. For example, the initial location may be established as corresponding to the location of the beacon 102 providing the strongest signal broadcast signal 106 to the receiver 112 as measured by the RSSI of the signal. In at least some instances, the initial location of the receiver 112 can be defined as a pair of rectangular coordinates $(x_0, Y_0)$.

At 406 a number of broadcast signals 106 are received by the receiver 112. Each of the received broadcast signals 106 has a signal strength (RSSI) and contains data indicative of the unique identifier of the originating beacon 102 that generated the signal. The receiver 112 can communicate data indicative of the RSSI value and the unique identifier associated with each received broadcast signal 106 to the processor 116.

At 408 the processor 116 receives the data indicative of the RSSI value and the unique identifier associated with each received broadcast signal 106 from the receiver 112. Using the unique identifier associated with each received broadcast signal 106, the processor 116 can determine the locations ((XB1, YB1) . . . (XBn, YBn)) of each of the originating beacons 102 from which a broadcast signal 106 has been received. In at least some instances, the beacon location information may be retrieved by the processor 116 from a data store in the nontransitory storage 118. Using the initial receiver location (xo, yo), the processor 116 can determine both a distance (L1B1 . . . L1Bn) and a direction (DB1 . . . DBn) between the receiver location and the location of each of the originating beacons 102 from which a broadcast signal 106 has been received.

The processor 116 can then determine a weighting factor for each of the received broadcast signals 106 (WB1 . . . WBn). In at least some instances, the weighting factor for each received broadcast signal 106 can be based on the RSSI value associated with the respective received broadcast signal. In at least some instances, the weighting factors may be retrieved by the processor 116 from a data store in the nontransitory storage 118. After retrieving the weighting factor for a particular broadcast signal, the processor multiplies the distance between the initial receiver location and the respective originating beacon location by the weighting factor to determine the magnitude of the vector quantity (MB1=(L1B1)(WB1)). The processor 116 repeats the processor retrieving a weighting factor and determining the magnitude of the vector quantity for each of the received broadcast signals (MBn=(L1Bn)(WBn)). The processor 116 thus characterizes each of the received broadcast signals 106 as a vector quantity (VB1 . . . VBn) having both a respective magnitude (MB1 . . . MBn) and a respective direction (DB1 . . . DBn).

At 410 the processor 116 sums the vector quantities Σ(VB1 . . . VBn) to generate a single resultant vector (R). The processor 116 then translates the receiver 112 from the initial location (xo, YO) to an updated location (X1, Y1), using the resultant vector.

At 412 the processor 116 determines whether the updated receiver location (X1, Y1) falls within one or more defined threshold. In at least some implementations, the defined threshold may include a distance threshold determined using the current and former receiver locations. In at least some implementations, the defined threshold may include a magnitude threshold determined using the magnitude of the resultant vector (R). If the updated receiver location fails to fall within the defined threshold, at the processor 116 will return to 406 and determine updated values for the vector quantities for each received broadcast signal 106 and an updated value for the resultant vector. In at least some implementations, the determination of the updated receiver location falling outside of the defined threshold may be repeated any number of times or may be replicated or repeated as one or more threads in a multi-threaded process. If the updated receiver location falls within the defined threshold the processor at 414 will update the location of the receiver. The RSSI balancing method concludes at 416.

In some instances, the position of the handheld electronic device 110 may not remain in a static location with respect to some or all of the beacons 102. In such instances, existing broadcast signals 106 will fade and disappear as the handheld electronic device 110 moves out of range and new broadcast signals 106 will appear as the handheld electronic device 110 moves within range. As such, the processor 116 may encounter a dynamic environment where broadcast signals 106 appear, increase in strength, decrease in strength, and disappear. Under such conditions, the processor 116 can maintain RSSI and beacon identification data associated with each of the respective received broadcast signals 106 as a dynamic beacon list. In at least some instances, the data comprising the beacon list may be stored in the nontransitory storage 118. In other instances, the data comprising the beacon list may be stored at least partially in a nontransitory storage location within the processor 116. In either event, the processor 116 will encounter situations where RSSI and identification data corresponding to a newly appearing beacon 102 is added to the beacon list for inclusion in determining the resultant vector and situations where stale RSSI and identification data corresponding to a disappearing beacon 102 is removed from the beacon list for exclusion from determining the resultant vector.

Figure 5:
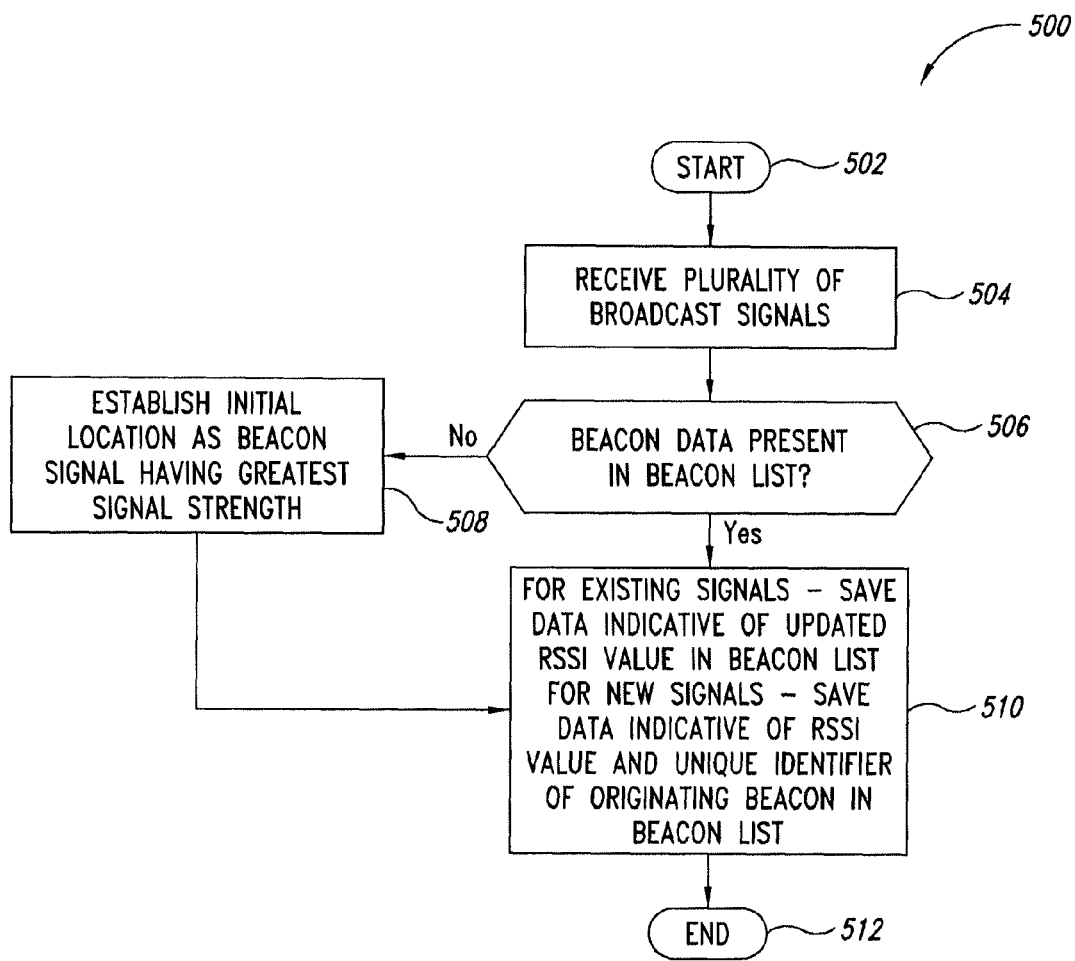
FIG. 5 is a high level logic flow diagram of an illustrative method for determining an initial location of a receiver using a non-time of flight indoor position location system, according to one non-limiting illustrated embodiment.

An illustrative method 500 for adding new beacon data to the beacon list and for determining an initial receiver location is provided in FIG. 5. The receiver 112 may, at times, receive new broadcast signals 106. Such may occur for example, when the receiver 112 initially enters the range of the beacons 102 in the arrangement 104—at such a time, the beacon list may not be populated with beacon data. Such may also occur for example, as the receiver 112 transits the arrangement 104, as the receiver comes within range of one or more previously out of range beacons, new broadcast signals may be received. The method for adding beacon data commences at 502.

At 504 a number of broadcast signals 106 are received by the receiver 112. Each of the received broadcast signals 106 has a signal strength (RSSI) and contains data indicative of the unique identifier of the originating beacon 102 that generated the signal. The receiver 112 can communicate data indicative of the RSSI value and the unique identifier associated with each received broadcast signal 106 to the processor 116.

At 506 the processor determines whether the beacon list is populated with any data indicative of an RSSI value and unique identifiers. If the processor 116 finds no data populating the beacon list, the handheld electronic device 110 has moved within range of the beacons 102 for the first time.

If the processor 116 finds no RSSI or unique identifier data in the beacon list at 506, at 508 the processor 116 establishes the initial receiver location (xo, YO) as the location of the beacon 102 providing the greatest RSSI value. If the processor 116 finds RSSI and unique identifier data in the beacon list at 506, at 510 the processor 116 updates the data contained in the beacon list. For broadcast signals 106 corresponding to originating beacons 102 that are already present in the beacon list, the processor 116 updates the beacon list with data indicative of the new RSSI value of the respective signal. For broadcast signals 106 corresponding to originating beacons 102 that are not already present in the beacon list, the processor 116 updates the beacon list with data indicative of both the RSSI value and the unique identifier associated with the respective originating beacon. The method for adding new beacon data to the beacon list concludes at 412.

Figure 6:
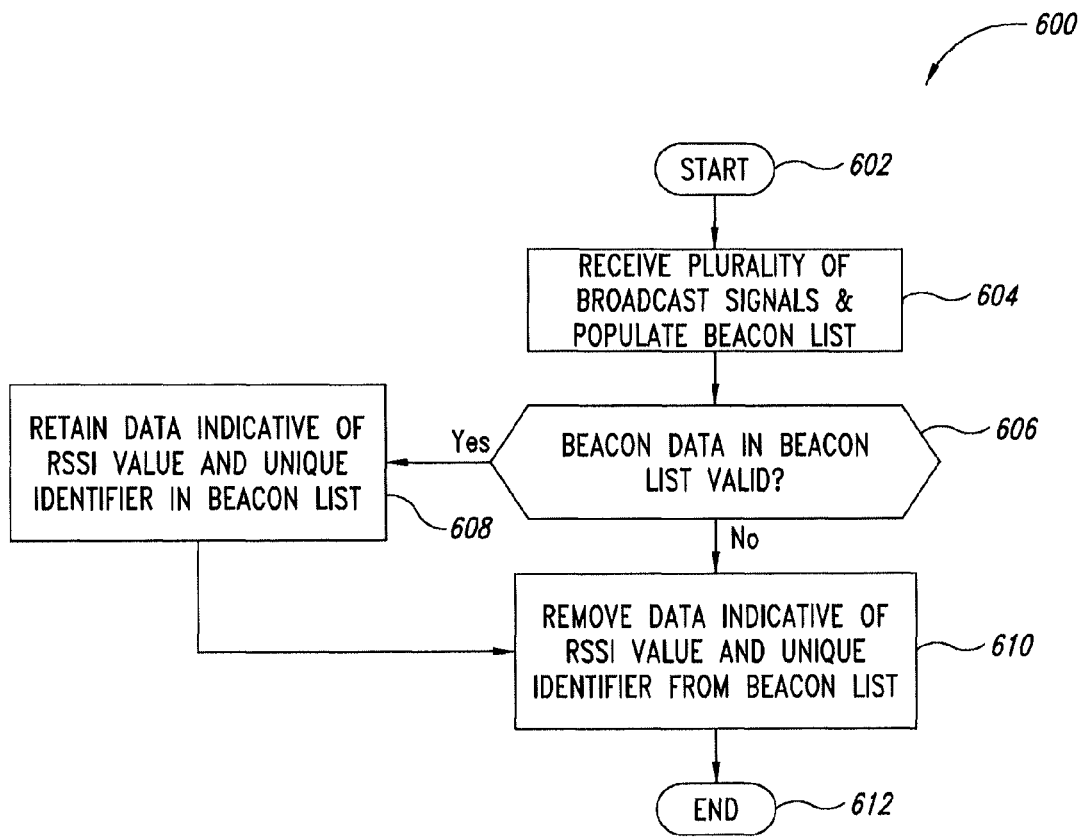
FIG. 6 is a high level logic flow diagram of an illustrative method for detecting stale beacon data by a receiver using a non-time of flight indoor position location system, according to one non-limiting illustrated embodiment.

An illustrative method 600 for removing stale beacon data from the beacon list is provided in FIG. 6. The receiver 112 may, at times, lose existing broadcast signals 106 as the handheld electronic device 110 moves away from originating beacon 102. In such circumstances, RSSI data of the broadcast signal 106 provided by the respective beacon may adversely affect the determination of the updated receiver location and should be excluded or removed from the beacon list. Such data may be referred to as constituting "stale" data. In some instances a defined RSSI cutoff threshold may be used to determine whether data provided by a particular beacon 102 should be considered "stale." For example, limiting the number of broadcast signals 106 by considering only a number of the strongest broadcast signals (i.e., broadcast signals having an RSSI value greater than a defined threshold or a number of the broadcast signals having the greatest RSSI value) in the position determination method 400 may improve the accuracy of the location or improve the speed with which the processor is able to resolve the location of the handheld electronic device 110. The method for removing stale beacon data commences at 602.

At 604 a number of broadcast signals 106 are received by the receiver 112. Each of the received broadcast signals 106 has a signal strength (RSSI) and contains data indicative of the unique identifier of the originating beacon 102 that generated the signal. The receiver 112 can communicate data indicative of the RSSI value and the unique identifier associated with each received broadcast signal 106 to the processor 116. At least a portion of the data indicative of the RSSI value and the unique identifier associated with each received broadcast signal 106 may be stored as a beacon list in a nontransitory memory. In at least some implementations, the beacon list may be stored in the nontransitory memory 118. In other implementations, all or a portion of the beacon list may be stored in a cache or similar nontransitory memory at least partially resident in the processor 116.

Each of the beacons 102 generates and transmits at intervals their respective unique identifier as a broadcast signal 106. Such broadcast intervals can be regular (e.g., every 2 seconds) or irregular (e.g., between 1 and 5 seconds) dependent at least in part on the transmitter(s) used to provide the beacons 102. At 606 the processor determines whether the data in the beacon list and associated with a particular beacon remains valid. In at least some instances, such validity determination is made using at least one of either a temporal cutoff threshold or a signal strength cutoff threshold.

In some implementations, a temporal cutoff threshold used by the processor 116 to remove stale data from the beacon list may be based on an elapsed time since the data indicative of the RSSI value associated with the broadcast signal from a particular beacon 102 was updated. In some instances, such temporal cutoff thresholds may be based on the broadcast interval of the beacons (e.g., data is removed after three consecutive broadcast intervals in which the RSSI value has either not changed or has changed by less than a defined cutoff amount). In other instances, such cutoff thresholds may be based on an absolute time interval (e.g., data is removed after ten consecutive seconds elapse in which the RSSI value has either not changed or has changed by less than a defined cutoff amount).

In some implementations, a signal strength cutoff threshold used by the processor 116 to remove stale data from the beacon list may be based on the RSSI value associated with the broadcast signal from a particular beacon 102. In some instances, such signal strength cutoff thresholds may be based removing the beacons having the lowest RSSI value from the beacon list. For example, removing beacons where the RSSI value falls below a defined RSSI cutoff threshold for a defined period of time (e.g., RSSI value below −105 dB for more than 5 seconds). In other instances, such signal strength cutoff thresholds may be based retaining the beacons having the greatest RSSI value on the beacon list. For example, removing beacons where the RSSI value falls below a percentage of the strongest RSSI value for a defined period of time (e.g., RSSI value below 67% of greatest RSSI value dB for more than 5 seconds). In yet other instances, such signal strength cutoff thresholds may be based on retaining a number of beacons providing the greatest RSSI values on the beacon list. For example, retaining a defined number of beacons having the greatest RSSI value over a defined interval and removing the remaining beacons (e.g., retaining data associated with five beacons having greatest RSSI values for more than 10 seconds, removing remaining beacons).

At 606 the processor 116 determines whether data associated with each of the beacons contained in the beacon list remains valid. As described in detail above, the processor 116 may use a temporal cutoff threshold, a signal strength cutoff threshold, or some combination thereof to determine whether the data associated with each of beacons represented in the beacon list remains valid.

At 608 the processor 116 retains data in the beacon list that was determined valid at 606.

At 610 the processor 116 removes data from the beacon list that was not determined valid at 606. The stale data removal method concludes at 612.

The ability to quickly and accurately determine the location of the handheld electronic device 110 in an indoor, enclosed, or covered environment 150 can permit a user in an environment such as a warehouse or similar covered industrial or storage facility to navigate through a number of points quickly and efficiently with a minimum of wasted movement. Such environments may include, but not limited to warehouses, supermarkets, warehouse retailers, manufacturing facilities, product storage facilities, industrial facilities, factories and the like may have goods scattered across an expansive indoor area. In such instances, the ability to provide a user with both their current location and the location of a desired object (e.g., a specific part or raw material needed to keep a manufacturing line operating) may be advantageous. Providing the user with routing instructions to enable or facilitate the movement of the user to the desired location in a minimal amount of time, covering a minimal distance, or avoiding bottlenecks, crowding or similar known obstructions or congestion in the environment improves the efficiency of the user and may improve the efficiency, capacity, or reliability of one or more external processes (e.g., assembly of goods, loading of containers, etc). Such position location and routing systems may be advantageously deployed in warehouses and similar settings where a number of users (e.g., forklift operators) operating in a tight, congested, or limited space indoor environment must retrieve, move, and replace objects quickly, efficiently, and with a minimum of either wasted time or travel. Such position location and routing systems may also be advantageously deployed in any number of commercial settings where facilitating the movement of consumers to desired products results in a more favorable experience for the consumer and encourages return visits by the consumer based at least in part on the favorable consumer experience.

In at least some instances, providing the user with the ability to locate desired objects using non-location based or similar colloquial search terms rather than requiring the user to identify a particular physical location where the object may be found further enhances the perceived value of the position location system 100 by the end user (e.g., picker, delivery person, forklift operator, etc.). For example, upon entering a warehouse for the first time a user may enter "DOG FOOD" on a user interface of a handheld electronic device 110 such as a smartphone or similar portable electronic device. The position location system 100 may respond with directions on the shortest or quickest route to warehouse bay 1A6 where dog food is located. From a user's perspective such a system is likely more preferable than a system where the user must initially determine the physical location of dog food and then query the system for instructions to the predetermined physical location. Similarly, the value to a forklift driver in a warehouse is enhanced if the driver is able to enter a UPC code from a bill of lading or other similar non-location based, product identification information or data, on a user interface of a handheld electronic device 110 such as a handheld computer to find the location of the item in a large indoor warehouse.

Such operational functionality may be further enhanced if the position location system 100 is able to provide a preferred routing to a number of desired locations within the enclosed, indoor, or covered environment. For example, respOnsive to a user such as a picker, warehouse worker, or consumer entering "DOG FOOD," "DOG TOYS," "CAT FOOD," and "KITTY LITTER" on a user interface of a handheld electronic device 110, the position location system provides not only the location associated with each of the entered items but also a preferred routing to minimize the distance or time required to travel between the locations of the items. In another implementation, a forklift driver may enter a number of UPC codes corresponding to a bill of lading for a particular container and in response the position location system provides not only the locations associated with each of the items corresponding to the entered UPC codes but also a preferred routing to minimize the distance or time required to travel between the locations or to avoid congestion or similar bottlenecks that may exist within the warehouse.

Figure 7:
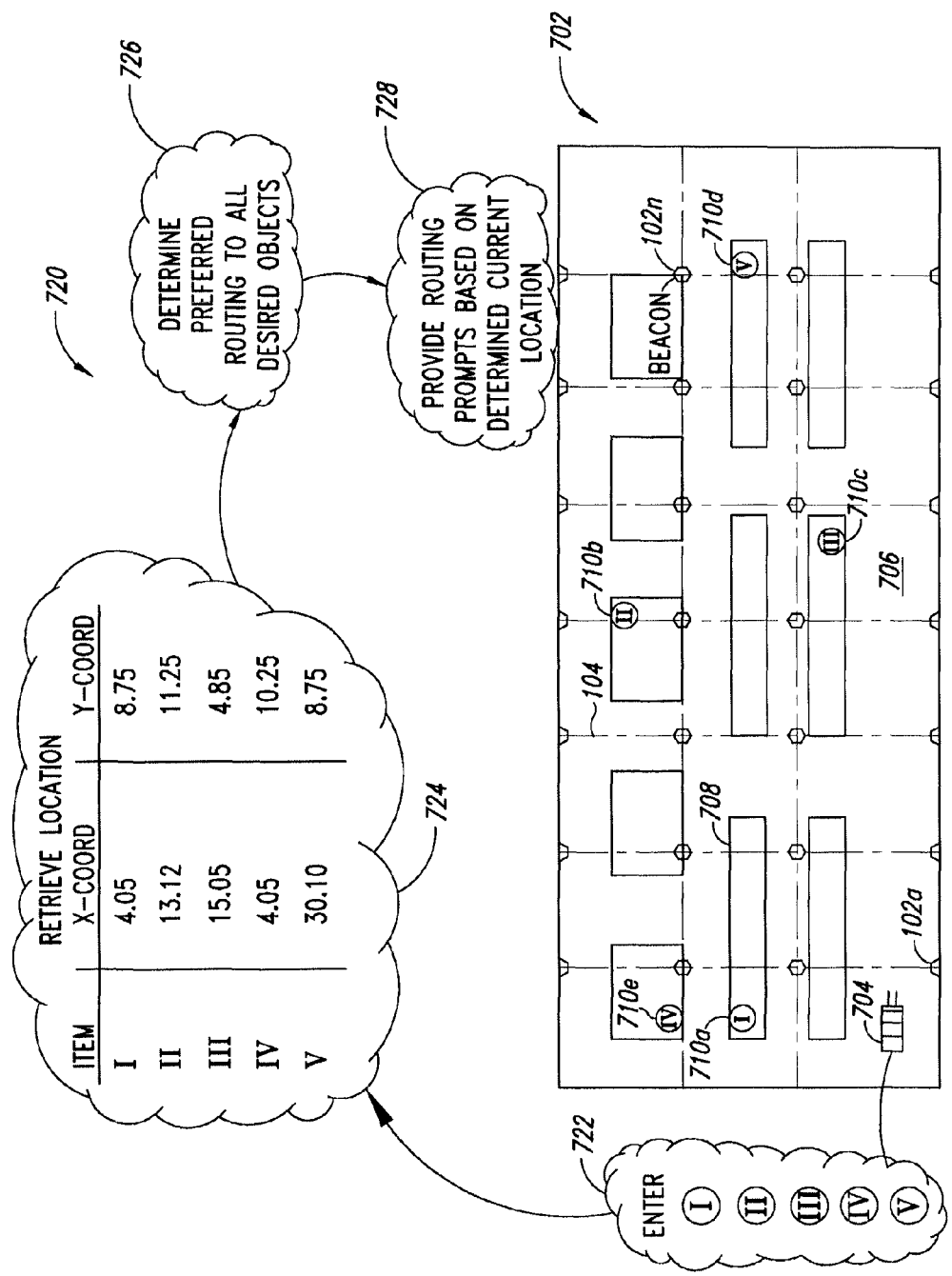
FIG. 7 is an environmental diagram illustrating an example the determination of a route to five different non-location based destinations within an indoor environment, the routing determined via a position location system that includes a receiver and a beacon matrix disposed in a commercial or industrial setting, according to one non-limiting illustrated embodiment.
Figure 8:
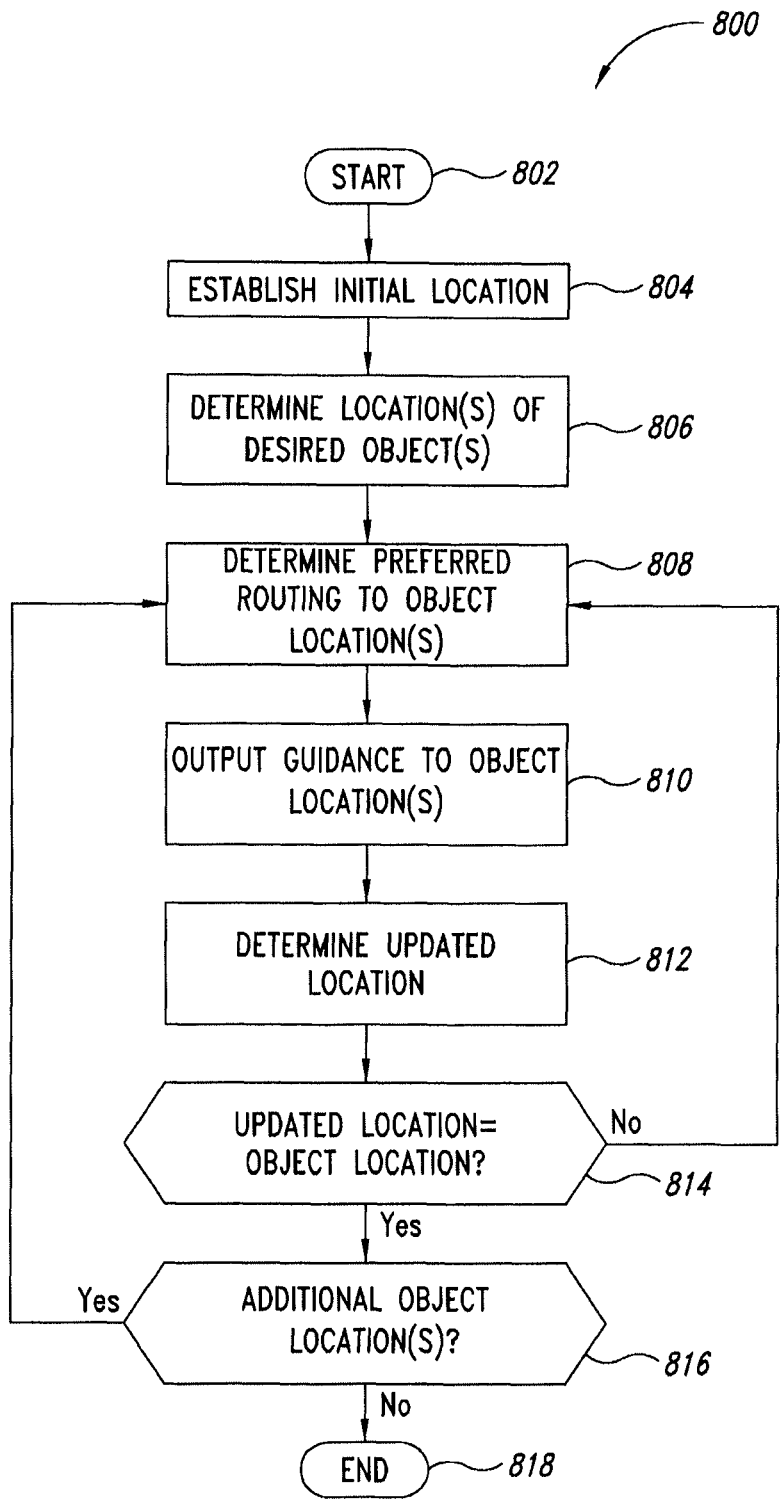
FIG. 8 is a high level logic flow diagram of an illustrative method for determining a routing within an indoor environment that includes a non-time of flight position location system, according to one non-limiting illustrated embodiment.

An illustrative warehouse 702 and an illustrative method 720 for providing a preferred routing to a number of locations within the warehouse using a position location system 100 are provided in FIG. 7. A number of beacons 102 are arranged in a substantially rectangular arrangement 104 within the warehouse 702. A number of objects 710a-710e (collectively "objects 710") are scattered on storage shelving 708 throughout the warehouse 702. Such objects 710 may be colloquially referred to by common names such as "RICE," "BEANS," and the like or by other non-location based identifiers such as UPC, product identification codes (e.g., "DVD," "CD," specific electronic equipment, etc.), manufacturer's name, model or part numbers, or similar. A forklift 704 is manned by a user equipped with a handheld electronic device 110 having an I/O interface 114 and a local or remote nontransitory storage 118 that includes a data store in which data indicative of an object's location in the warehouse 702 is indexed by the colloquial or common name of the object.

The user can enter object data 722 that is indicative of the colloquial or common name of the objects 710, or even a specific make and model number of the objects 710 (e.g., "DELL ULTRASHARP 27" DISPLAY 42711") into the handheld electronic device 110 via the I/O interface 114. In at least some implementations, object data 722 may be entered using a physical or virtual keyboard such as that found on the CN70 handheld computer manufactured by Intermec, Inc. (Everett, Wash.). In other implementations, object data 722 may be entered using an alternative input method such as by selection of appropriate icons or other symbols corresponding to the desired objects that are presented on a capacitive or resistive touchscreen or the like.

Upon receipt of the object data 722, the processor 116 can determine the location of each of the desired objects 710. In at least some implementations, the data corresponding to the location of each of the desired objects may be retrieved by the processor 116 from a data store 724 in the nontransitory storage 718. Within the data store 724, data indicative of an object's location in the warehouse 702 may be indexed or otherwise referenced by the colloquial or common name of the object.

After determining the physical location of each of the desired objects 710, the processor 116 can determine a preferred routing 726 to the locations where each of the desired objects 710 may be found. The preferred routing 726 may include a routing based on at least one of the following: a routing that results in the shortest expected travel time; a routing that results in the shortest distance; a routing that avoids a known area of congestion; a routing that avoids a known obstruction; or a routing that avoids creating a congestion point. The preferred routing 726 may be determined using one or more algorithms including but not limited to a Branch-and-Bound algorithm, a Bellman-Ford algorithm, a Dijkstra algorithm, a Johnson algorithm, a Nearest Neighbor algorithm, or any similar current or future developed path or route optimization algorithm known to one of ordinary skill in the art.

After determining the preferred routing, the processor 116 may provide a human perceptible output 728 to guide the user along the route based on the user's current location in the warehouse 702 as determined by the position location system 100. Such a system may advantageously update the preferred routing based on the determined location of the user within the warehouse so that an unexpected turn or detour by the user 704 may be seamlessly accommodated. In at least some implementations, preferred routing information may be periodically or intermittently updated by the processor 116 to avoid routing multiple users on a common route segment to avoid creating congestion or to avoid a transient or intermittent obstruction of the preferred route thereby minimizing congestion for all users. One of ordinary skill in the art will readily appreciate the broad applicability of such position location and routing systems, particularly when utilized in enclosed, indoor, or covered commercial establishments, industrial facilities, manufacturing facilities, retail establishments, shopping malls, sporting stadiums, and the like.

An illustrative method 800 for determining a user's location within an indoor, enclosed, or covered environment using a position location system 100 and also providing a guided preferred routing to a number of desired objects within such an environment is provided in Figure B. A user can provide input data to the position location system 100 via the I/O interface 114. In at least some instances, the input data provided by the user may include data indicative of one or more preferred locations or objects to which the user would like to travel. Where the input includes one or more such desired objects or locations, the processor 116 may retrieve or lookup the locations corresponding to those objects in a data store, at least a portion of which may be stored or otherwise retained in the nontransitory storage 11B. After identifying the locations corresponding to the user inputted desired objects, the processor 116 may determine one or more preferred routes to each of the locations. In at least some implementations, the routing so determined by the processor 116 may reflect one or more real time conditions such as obstructions, congestion, the preferred routing of other users, and the like which may adversely impact the travel of the user. In at least some implementations, the routing may be determined to avoid congested areas or to avoid creation of congested areas within the environment. In at least some implementations, the preferred routing may be determined by the processor 116 on a point-to-point basis while in other implementations the preferred routing may be determined on a "round trip" basis that includes the locations of all of the user inputted desired objects. The method commences at 802. At 804 a number of broadcast signals 106 are received by the receiver 112. Each of the received broadcast signals 106 has a signal strength (RSSI) and contains data indicative of the unique identifier of the originating beacon 102 that generated the signal. The receiver 112 can communicate data indicative of the RSSI value and the unique identifier associated with each received broadcast signal 106 to the processor 116. At least a portion of the data indicative of the RSSI value and the unique identifier associated with each received broadcast signal 106 may be stored as a beacon list in a nontransitory memory. In at least some implementations, the beacon list may be stored in the nontransitory memory 118. In other implementations, all or a portion of the beacon list may be stored in a cache or similar nontransitory memory at least partially resident in the processor 116.

At 806 the processor 116 receives user input indicative of the desired objects or desired locations to which the user would like to travel. In at least some implementations such data may be provided in the form of colloquial terms for some or all of the objects. Such may include the name of an object or an identifier or code that may be associated or otherwise related to the object, for example a UPC or similar code that uniquely identifies the object. Responsive to the receipt of this object data, the processor 116 can retrieve or otherwise acquire location information associated with each of the desired objects inputted by the user to the position location system 100. Such location information may be retrieved or otherwise acquired by the processor 116 from a data store containing data indicative of an object's location within the indoor or covered environment 150 that is indexed or otherwise referenced by the object's name, identifier, or code. In at least some instances, the data store may be partially or completely stored or otherwise retained in the nontransitory storage 118. In other instances, the data store may be partially or completely stored or otherwise retained in a centralized nontransitory memory to which the processor 116 is directly or indirectly communicably coupled, for example via the network 130.

At 808 the processor 116 can determine a preferred routing to the location(s) of the desired object(s) inputted by the user at 806. In at least some implementations, the preferred routing may include the locations of all of the objects inputted by the user at 806. In at least some implementations, the preferred routing may include only the location of the first or of the geographically closest object inputted by the user at 806. In at least some implementations, the processor 116 may determine the preferred routing based on minimizing travel time to the location, minimizing travel distance to the location, avoiding congestion or obstructions along the route to the location, or combinations thereof. In at least some instances, such routings may be determined collaboratively with the position location systems 100 operated by other users. Such collaborative routing is particularly advantageous in environments such as warehouses where numerous users may be routed along a limited number of common pathways (i.e., aisles) to access the locations.

At 810 the processor 116 can provide a human perceptible output providing guidance to the location of the desired object. Such human perceptible output can include, but is not limited to, visual guidance provided via the I/O interface 118, audible guidance provided via the I/O interface 118, or any combination thereof.

At 812 the processor 116 can determine the updated location of the user. By periodically or intermittently updating the location of the user, the processor 116 is able to provide guidance to the desired object even if the user does not (e.g., by taking a wrong turn) or is unable to (e.g., due to an obstruction or unsafe condition) follow the prescribed routing provided by the processor 116 to the desired object.

At 814 the processor determines whether the location of the handheld electronic device 110 is within a defined distance of the location of the desired object. If the handheld electronic device 110 is not within the defined distance (i.e., the handheld electronic device 110 has not arrived at the location of the desired object) the processor returns to 808 and determines the preferred routing to the location of the desired object. If, on the other hand, the handheld electronic device 110 is within the defined distance (i.e., the handheld electronic device 110 has arrive at the location of the desired object) the processor proceeds to 816 to determine whether additional desired objects exist.

If additional desired objects are found by the processor at 816, the processor returns to 808 and determines the preferred routing to the location of the next desired object using the determined current location of the handheld electronic device 110. If, on the other hand, no additional desired objects are found by the processor at 816, the preferred routing method concludes at 818.

Also for example, the various methods may include additional acts, omit some acts, and may perform the acts in a different order than set out in the various flow diagrams. The use of ordinals such as first, second and third, do not necessarily imply a ranked sense of order, but rather may only distinguish between multiple instances of an act or structure.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Some embodiments are provided as:

A1. A non-time of flight or time of arrival position location system, comprising:
  a receiver to receive a plurality of broadcast signals, each of the plurality of received signals characterized by a respective signal strength and by data that uniquely identifies an originating one of a plurality of terrestrial radio frequency beacons positioned in a respective known location within an indoor environment;
  at least one input/output device;
  a processor communicably coupled to the receiver and the at least one input/output device; and
  processor-executable instructions that cause the processor to:

determine an initial receiver location relative to the known locations of at least some of the plurality of beacons;

for each of the received broadcast signals, iteratively determine an updated receiver location relative to the known locations of the at least some of the plurality of beacons by causing the processor to:

determine a vector quantity including a magnitude and a direction associated with each of the plurality of received broadcast signals to provide a respective plurality of vector quantities; and sum the resultant plurality of vector quantities to determine the updated receiver location until a number of consecutive iterations provide updated receiver locations falling within a defined limit; and generate at least one human-perceptible output indicative of the updated receiver location via the at least one output device A2. The non-time of flight or time of arrival position location system of claim 1, further comprising:
a nontransitory storage media communicably coupled to the processor, the nontransitory storage media to store a number of defined locations indexed by one or more non-location based identifiers;
wherein the executable instructions further cause the processor to:
receive data representative a number of non-location based
determine a number of defined locations, each of the number of defined locations associated with a respective one of the number of received non-location based identifiers;
determine a preferred routing to each of the number of defined locations within the environment; and
generate at least one human-perceptible output indicative of progressive directional information along the preferred routing.

A3. The non-time of flight or time of arrival position location system of claim 1 wherein the receiver and the at least one output device are at least partially disposed in a portable housing, the processor is disposed remote from the portable housing and the communicable coupling between the receiver, the at least one output device and the processor includes a wireless communicable coupling.

A4. The non-time of flight or time of arrival position location system of claim 1 wherein the receiver and the at least one output device and the processor are collocated and at least partially disposed in a portable housing.

A5. The non-time of flight or time of arrival position location system of claim 1 wherein the at least one output device comprises at least one of: an audio speaker, an audio output interface, a display device, a display output interface, or a touchscreen.

A6. The non-time of flight or time of arrival position location system of claim 1 wherein to determine an initial receiver location, the processor-executable instructions cause the processor to:
generate and store data representative of an initial beacon list in a nontransitory storage medium communicably coupled to the processor, the initial beacon list including for each of the plurality of received signals: data indicative of the signal strength of the received signal and data indicative of the unique identifier associated with the respective originating beacon; and set the initial receiver location equal to the location of the beacon providing the greatest signal strength at the receiver.

A7. The non-time of flight or time of arrival position location system of claim 6 wherein to determine the vector quantity including a magnitude and direction associated with each of the plurality of received signals, the processor-executable instructions cause the processor to:
replace all or a portion of the data representative of the initial beacon list with data representative of an updated beacon list, the data representative of the updated beacon list including for each of the plurality of received signals: data indicative of the signal strength of the respective signal and the data indicative of the unique identifier associated with the respective originating beacon.

A8. The non-time of flight or time of arrival position location system of claim 7 wherein the processor-executable instructions further cause the processor to:
remove the signal strength and unique identification data representative of a beacon from the updated beacon list to purge stale data when the signal strength of the signal provided by the respective beacon fulfills at least one defined removal criterion.

A9. The non-time of flight or time of arrival position location system of claim 1 wherein each of the plurality of broadcast signals consists of data that uniquely identifies one of the plurality of terrestrial radio frequency beacons originating the respective signal.

A10. A non-time of flight or time of arrival position location method, comprising:
receiving by a receiver communicably coupled to a processor a plurality of broadcast signals, each of the plurality of received signals characterized by a respective signal strength and by data that uniquely identifies an originating one of a plurality of terrestrial radio frequency beacons positioned in respective known locations in an indoor environment;
determining by the processor an initial receiver location relative to the known locations of at least some of the plurality of beacons;
iteratively determining an updated receiver location relative to the known locations of at least some of the plurality of beacons by:
determining a plurality of vector quantities by the processor, each vector quantity in the plurality of vector quantities including a magnitude and a direction associated with the signal received from each of a plurality of originating beacons; and
summing the plurality of vector quantities by the processor to determine the updated receiver location until a number of consecutive iterations provide updated receiver locations falling within a defined limit; and
generating at least one human-perceptible output indicative of the updated receiver location via at least one output device communicably coupled to the processor.

A11. The non-time of flight or time of arrival position location method of claim 10, further comprising:
determining a preferred routing to each of a number of defined locations in the indoor environment; and
generating at least one human-perceptible output indicative of progressive directional information along the preferred routing.

A12. The non-time of flight or time of arrival position location method of claim 11 wherein determining a preferred routing to each of a number of defined locations in the indoor environment comprises:

receiving data representative a number of non-location based identifiers; and determining the number of defined locations in the indoor environment corresponding to a respective one of the number of non-location based identifiers, each of the number of defined locations retrieved from a data store indexed using non-location based identifiers and stored at least partially in a nontransitory storage media communicably coupled to the processor.

A13. The non-time of flight or time of arrival position location method of claim 11, wherein determining a preferred routing to each of a number of defined locations in the indoor environment comprises:

determining a routing to each of a number of defined locations based on at least one of: the shortest distance between at least a portion of the number of defined locations, the least travel time between at least a portion of the number of defined locations, or the lowest traffic between at least a portion of the number of defined locations.

A14. The non-time of flight or time of arrival position location method of claim 10 wherein the known location of each of the plurality of beacons is provided as data representative of the geolocation of the respective beacon, the geolocation data stored in a persistent processor-readable nontransitory storage.

A15. The non-time of flight or time of arrival position location method of claim 14, further comprising determining by the processor a geolocation corresponding to the updated receiver location using the data representative of the geolocation of each of the originating beacons.

A16. The non-time of flight or time of arrival position location method of claim 10 wherein determining an initial receiver location comprises:

generating and storing data representative of an initial beacon list in a nontransitory storage medium communicably coupled to the processor, the initial beacon list including for each of the plurality of received signals: data indicative of the signal strength of the received signal and data indicative of the unique identifier associated with the respective originating beacon; and setting the initial receiver location as the location of the originating beacon providing the greatest signal strength at the receiver.

A17. The non-time of flight or time of arrival position location method of claim 16 wherein determining a plurality of vector quantities by the processor includes:

replacing all or a portion of the data representative of the initial beacon list with data representative of an updated beacon list, the data representative of the updated beacon list including for each of the plurality of received signals data indicative of the signal strength of the respective signal and the data indicative of the unique identifier associated with the respective originating beacon.

A18. The non-time of flight or time of arrival position location method of claim 17, further comprising purging stale data from the updated beacon list by:

removing from the updated beacon list by the processor the signal strength and unique identification data associated with a beacon when the signal strength of the signal provided by the respective beacon fulfills at least one defined removal criterion.

A19. The non-time of flight or time of arrival position location method of claim 17 wherein replacing all or a portion of the data representative of the initial beacon list with data representative of an updated beacon list comprises:

temporally ordering the data included in the updated beacon based at least in part on the order the data was received by the receiver.

A20. The non-time of flight or time of arrival position location method of claim 19 wherein the processor purges stale data from the updated beacon list by:

removing from the updated beacon list the signal strength and unique identification data associated with a beacon when the signal strength of the signal provided by the respective beacon has not been updated within a defined period of time.

B21. A non-time of flight or time of arrival position location system, comprising:

a receiver to receive a plurality of broadcast signals, each of the plurality of received signals characterized by a respective signal strength and by data that uniquely identifies an originating one of a plurality of terrestrial radio frequency beacons positioned in a respective known location within an indoor environment;

at least one output device;

a processor communicably coupled to the receiver and the at least one output device;

processor-executable instructions that cause the processor to:

determine an initial receiver location relative to the known locations of at least a portion of the plurality of beacons;

for each of a plurality of received broadcast signals, iteratively determine an updated receiver location relative to the known locations of at least a portion of the plurality of beacons by causing the processor to:

determine a signal strength of the received signal and detecting the data that uniquely identifies the respective originating beacon;

determine a vector quantity associated with each of the plurality of received signals to provide a plurality of vector quantities, the vector quantity for each of the plurality of received signals including at least:

a direction coincident with a shortest line between the processor and the known location of the respective originating beacon; and a magnitude based at least in part on the non-temporal based signal strength of the broadcast signal and a distance separating the processor from the respective originating beacon; and sum the plurality of vector quantities by the processor to determine the updated receiver location until a number of consecutive iterations provide updated receiver locations falling within a defined limit; and generate at least one human-perceptible output indicative of the updated receiver location via the at least one output device.

B22. The non-time of flight or time of arrival position location system of claim 21, further comprising a processor-readable nontransitory memory communicably coupled to the processor, the processor-readable nontransitory memory including data indicative of the known location of each of the plurality of beacons.

B23. The non-time of flight or time of arrival position location system of claim 22 wherein the data indicative of the known location of each of the plurality of beacons includes data indicative of the geolocation of each of the plurality of beacons; and wherein instructions executable by the processor further cause the processor to determine a geolocation corresponding to the updated receiver location.

B24. The non-time of flight or time of arrival position location system of claim 21, further comprising a processor-readable nontransitory memory communicably coupled to the processor, the processor-readable nontransitory memory including data including a number of defined locations each indexed using at least one respective non-location based identifier; and wherein the processor-executable instructions further cause the processor to:
  receive data indicative of a number of non-location based identifiers;
  determine the number of defined locations in the environment, each of the defined locations corresponding to a respective one of the non-location based identifiers;
  determine a preferred routing to each of the number of defined locations;
and generate at least one human-perceptible output indicative of progressive directional information along the preferred routing.

B25. The non-time of flight or time of arrival position location system of claim 21 wherein the receiver and the at least one output device are at least partially disposed in a portable housing, the processor is disposed remote from the portable housing and the communicable coupling between the receiver, and the at least one output device and the processor includes a wireless communicable coupling.

B26. The non-time of flight or time of arrival position location system of claim 21 wherein the receiver and the at least one output device and the processor are collocated and at least partially disposed in a portable housing.

B27. The non-time of flight or time of arrival position location system of claim 21 wherein the at least one output device comprises at least one of: an audio speaker, an audio output interface, a display device, a display output interface, or a touchscreen.

B28. The non-time of flight or time of arrival position location system of claim 21 wherein to determine an initial receiver location relative to the known locations of at least a portion of the plurality of beacons and for each of a plurality of received broadcast signals, the processor-executable instructions cause the processor to:

generate and store data representative of an initial beacon list in a nontransitory storage medium communicably coupled to the processor, the initial beacon list including for each of the plurality of received signals: data indicative of the signal strength of the received signal and data indicative of the unique identifier associated with the respective originating beacon; and set the initial receiver location equal to the location of the beacon providing the greatest signal strength at the receiver.

B29. The non-time of flight or time of arrival position location system of claim 28 wherein to determine the vector quantity including a non-temporal based magnitude and a non-temporal based direction associated with each of the plurality of received signals to provide a plurality of vector quantities, the processor-executable instructions cause the processor to:

replace all or a portion of the data representative of the initial beacon list with data representative of an updated beacon list, the data representative of the updated beacon list including for each of the plurality of received signals: data indicative of the signal strength of the respective signal and data indicative of the unique identifier associated with the respective originating beacon.

B30. The non-time of flight or time of arrival position location system of claim 29 wherein the processor-executable instructions further cause the processor to:

remove the signal strength and unique identification data representative of a beacon from the updated beacon list to purge stale data from the updated beacon list when the signal strength of the signal provided by the respective beacon fulfills at least one defined removal criterion.

B31. The non-time of flight or time of arrival position location system of claim 21 wherein each of the plurality of broadcast signals consists of data that uniquely identifies one of the plurality of terrestrial radio frequency beacons originating the respective signal.

C32. A non-time of flight or time of arrival position location method, comprising:

receiving by a receiver communicably coupled to a processor a plurality of broadcast signals, each of the plurality of received signals characterized by a respective signal strength and by data that uniquely identifies an originating one of a plurality of terrestrial radio frequency beacons positioned in respective known locations in an indoor environment;

determining an initial receiver location relative to the known locations of at least some of the plurality of beacons by the processor;

iteratively determining an updated receiver location relative to the known locations of at least some of the plurality of beacons by:
  determining a signal strength of the received signal and detecting the data indicative of the unique identifier of the originating beacon for each of the plurality of received signals;
  determining a vector quantity associated with each of the plurality of received signals to provide a plurality of vector quantities, the vector quantity for each of the respective plurality of received signals including at least:
    a direction coincident with a shortest line connecting the processor to the known location of the respective originating beacon; and
    a magnitude based at least in part on the signal strength of the received signal and a distance separating the processor from the respective originating beacon; and
  summing the resultant plurality of vector quantities to determine the updated receiver location until consecutive iterations provide updated receiver locations falling within a defined limit; and
  generating at least one human-perceptible output indicative of the updated receiver location via at least one output device communicably coupled to the controller.

C33. The non-time of flight or time of arrival position location method of claim 32, further comprising:

determining a preferred routing to each of a number of defined locations; and generating at least one human-perceptible output indicative of progressive directional information along the preferred routing.

C34. The non-time of flight or time of arrival position location method of claim 32 wherein determining a preferred routing to each of a number of defined locations comprises:
receiving data representative of a number of non-location based identifiers; and
determining the number of defined locations within the environment corresponding to a respective one of the number of received non-location based identifiers, each of the number of defined locations retrieved from a data store indexed using one or more non-location based identifiers and stored at least partially in a nontransitory storage media communicably coupled to the processor.

C35. The non-time of flight or time of arrival position location method of claim 32, wherein determining a preferred routing to each of a number of defined locations comprises:
determining a routing to each of a number of defined locations based on at least one of: the shortest distance between at least a portion of the number of defined locations, the least travel time between at least a portion of the number of defined locations, or the lowest traffic between at least a portion of the number of defined locations.

C36. The non-time of flight or time of arrival position location method of claim 32, further comprising determining a geolocation corresponding to the updated receiver location using geolocation data for each of the plurality of beacons, the geolocation data stored in a processor-readable nontransitory memory that is communicably coupled to the processor.

C37. The non-time of flight or time of arrival ht position location method of claim 32 wherein determining an initial receiver location comprises:
setting the initial receiver location as the location of the originating beacon providing the greatest signal strength at the receiver.

C38. The non-time of flight or time of arrival position location method of claim 32 wherein determining an initial receiver location comprises:
generating and storing data representative of an initial beacon list in a nontransitory storage medium communicably coupled to the processor, the initial beacon list including for each of the plurality of received signals: data indicative of the signal strength of the received signal and data indicative of the unique identifier associated with the respective originating beacon; and
setting the initial receiver location as the location of the originating beacon providing the greatest signal strength at the receiver.

C39. The non-time of flight or time of arrival position location method of claim 38 wherein determining a plurality of vector quantities by the processor includes:
replacing all or a portion of the data representative of the initial beacon list with data representative of an updated beacon list, the data representative of the updated beacon list including for each of the plurality of received signals data indicative of the signal strength of the respective signal and the data indicative of the unique identifier associated with the respective originating beacon.

C40. The non-time of flight or time of arrival position location method of claim 39, further comprising purging stale data from the updated beacon list by:
removing from the updated beacon list by the processor the signal strength and unique identification data associated with a beacon when the signal strength of the signal provided by the respective beacon fulfills at least one defined removal criterion.

C41. The non-time of flight or time of arrival position location method of claim 39 wherein replacing all or a portion of the data representative of the initial beacon list with data representative of an updated beacon list comprises:
temporally ordering the data included in the updated beacon based at least in part on the order the data was received by the receiver.

C42. The non-time of flight or time of arrival position location method of claim 41, further comprising purging stale data from the updated beacon list by:
removing from the updated beacon list the signal strength and unique identification data associated with a beacon when the signal strength of the signal provided by the respective beacon has not been updated within a defined period of time.

What is claimed is:

1. A position location system, comprising:
a receiver to receive a plurality of broadcast signals, each of the plurality of received signals associated with an originating one of a plurality of beacons;
a processor that:
determines an initial receiver location relative to locations of at least some of the plurality of beacons;
determines a vector quantity associated with each of the plurality of received broadcast signals to provide a respective plurality of vector quantities;
determines an updated receiver location based on summing the plurality of vector quantities;
generates an output indicative of the updated receiver location.

2. The location system of claim 1, further comprising:
a nontransitory storage media communicably coupled to the processor, the nontransitory storage media to store a number of defined locations indexed by one or more non-location based identifiers;
wherein the processor:
receives data representative a number of non-location based identifiers;
determines a number of defined locations, each of the number of defined locations associated with a respective one of the number of received non-location based identifiers;
determines a preferred routing to each of the number of defined locations within the environment; and
generates at least one human-perceptible output indicative of progressive directional information along the preferred routing.

3. The location system of claim 1 wherein the receiver and the at least one output device and the processor are collocated and at least partially disposed in a portable housing.

4. The location system of claim 1 wherein to determine an initial receiver location, the processor:
generates and stores data representative of an initial beacon list in a nontransitory storage medium communicably coupled to the processor, the initial beacon list including for each of the plurality of received signals: data indicative of the signal strength of the received signal and data indicative of the unique identifier associated with the respective originating beacon; and sets the initial receiver location equal to the location of the beacon providing the greatest signal strength at the receiver.

5. The location system of claim 1 wherein each of the plurality of broadcast signals consists of data that uniquely identifies one of the plurality of terrestrial radio frequency beacons originating the respective signal.

6. A method, comprising:
receiving, by a receiver communicably coupled to a processor, a plurality of broadcast signals identifying terrestrial radio frequency beacons;
determining by the processor an initial receiver location;
determining an updated receiver location by:
determining a plurality of vector quantities associated with the signals received from the plurality of originating beacons; and
determining the updated receiver location by summing the plurality of vector quantities; and
outputting the updated receiver location.

7. The method of claim 6, further comprising:
determining a preferred routing to each of a number of defined locations; and
generating at least one human-perceptible output indicative of progressive directional information along the preferred routing.

8. The method of claim 7 wherein determining a preferred routing to each of a number of defined locations in the indoor environment comprises:
receiving data representative a number of non-location based identifiers; and
determining the number of defined locations in the indoor environment corresponding to a respective one of the number of non-location based identifiers, each of the number of defined locations retrieved from a data store indexed using non-location based identifiers and stored at least partially in a nontransitory storage media communicably coupled to the processor.

9. The method of claim 8, wherein determining a preferred routing to each of a number of defined locations in the indoor environment comprises:
determining a routing to each of a number of defined locations based on at least one of: the shortest distance between at least a portion of the number of defined locations, the least travel time between at least a portion of the number of defined locations, or the lowest traffic between at least a portion of the number of defined locations.

10. The method of claim 6 wherein the known location of each of the plurality of beacons is provided as data representative of the geolocation of the respective beacon, the geolocation data stored in a persistent processor-readable nontransitory storage.

11. The method of claim 10, further comprising determining by the processor a geolocation corresponding to the updated receiver location using the data representative of the geolocation of each of the originating beacons.

12. The method of claim 6 wherein determining an initial receiver location comprises:
generating and storing data representative of an initial beacon list in a nontransitory storage medium communicably coupled to the processor, the initial beacon list including for each of the plurality of received signals: data indicative of the signal strength of the received signal and data indicative of the unique identifier associated with the respective originating beacon; and
setting the initial receiver location as the location of the originating beacon providing the greatest signal strength at the receiver.

13. The method of claim 12 wherein determining a plurality of vector quantities by the processor includes:
replacing all or a portion of the data representative of the initial beacon list with data representative of an updated beacon list, the data representative of the updated beacon list including for each of the plurality of received signals data indicative of the signal strength of the respective signal and the data indicative of the unique identifier associated with the respective originating beacon.

14. The method of claim 13, further comprising purging stale data from the updated beacon list by:
removing from the updated beacon list by the processor the signal strength and unique identification data associated with a beacon when the signal strength of the signal provided by the respective beacon fulfills at least one defined removal criterion.

15. The method of claim 13 wherein replacing all or a portion of the data representative of the initial beacon list with data representative of an updated beacon list comprises:
temporally ordering the data included in the updated beacon list based at least in part on the order the data was received by the receiver.

16. The method of claim 15 wherein the processor purges stale data from the updated beacon list by:
removing from the updated beacon list the signal strength and unique identification data associated with a beacon when the signal strength of the signal provided by the respective beacon has not been updated within a defined period of time.

17. A non-transitory computer readable medium having computer instructions embedded therein that, when executed by a computer, cause the computer to perform a method, the method comprising:
receiving a plurality of broadcast signals identifying terrestrial radio frequency beacons;
determining an initial receiver location;
determining an updated receiver location by:
determining a plurality of vector quantities associated with the signals received from the plurality of originating beacons; and
determining the updated receiver location by summing the plurality of vector quantities; and
outputting the updated receiver location.

18. The non-transitory computer readable medium of claim 17, wherein the method further comprises:
determining a preferred routing to each of a number of defined locations; and
generating at least one human-perceptible output indicative of progressive directional information along the preferred routing.

19. The non-transitory computer readable medium of claim 18 wherein determining a preferred routing to each of a number of defined locations in the indoor environment comprises:
receiving data representative a number of non-location based identifiers; and
determining the number of defined locations in the indoor environment corresponding to a respective one of the number of non-location based identifiers, each of the number of defined locations retrieved from a data store indexed using non-location based identifiers; and
determining a routing to each of a number of defined locations based on at least one of: the shortest distance between at least a portion of the number of defined locations, the least travel time between at least a portion of the number of defined locations, or the lowest traffic between at least a portion of the number of defined locations.

20. The non-transitory computer readable medium of claim 17, wherein determining an initial receiver location comprises:

generating and storing data representative of an initial beacon list, the initial beacon list including for each of the plurality of received signals: data indicative of the signal strength of the received signal and data indicative of the unique identifier associated with the respective originating beacon; and setting the initial receiver location as the location of the originating beacon providing the greatest signal strength at the receiver.

\* \* \* \* \*